US012787034B2

(12) United States Patent
Zhang et al.

(10) Patent No.: US 12,787,034 B2
(45) Date of Patent: Nov. 3, 2026

(54) SYSTEMS AND METHODS FOR SIDE-LINK COMMUNICATION FOR POSITIONING INFORMATION

(71) Applicant: ZTE CORPORATION, Shenzhen (CN)

(72) Inventors: Shujuan Zhang, Shenzhen (CN); Chuangxin Jiang, Shenzhen (CN); Zhaohua Lu, Shenzhen (CN); Weimin Xing, Shenzhen (CN); Ke Yao, Shenzhen (CN); Guozeng Zheng, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 295 days.

(21) Appl. No.: 18/517,556

(22) Filed: Nov. 22, 2023

(65) Prior Publication Data

US 2024/0188100 A1 Jun. 6, 2024

Related U.S. Application Data

(63) Continuation of application No. PCT/CN2021/125610, filed on Oct. 22, 2021.

(51) Int. Cl.
*H04W 72/25* (2023.01)
*H04L 5/00* (2006.01)

(52) U.S. Cl.
CPC ........... *H04W 72/25* (2023.01); *H04L 5/0007* (2013.01); *H04L 5/0051* (2013.01)

(58) Field of Classification Search
CPC ..................................................... H04W 72/25
See application file for complete search history.

(56) References Cited

U.S. PATENT DOCUMENTS 12,052,743 B2 * 7/2024 Panteleev ............... H04W 4/46
2020/0305174 A1 * 9/2020 Ganesan ............... H04W 72/12
2021/0219268 A1 * 7/2021 Li ......................... H04W 72/02
2021/0227491 A1 7/2021 Shin et al.
2021/0297206 A1 * 9/2021 Manolakos ....... H04W 72/0446
2022/0385423 A1 * 12/2022 Ko ...................... H04W 52/281
(Continued)

FOREIGN PATENT DOCUMENTS

TW 202137785 A 10/2021
WO WO-2021/112610 A1 6/2021
(Continued)

OTHER PUBLICATIONS

Extended European Search Report for EP Appl. No. 21961038.3, dated Sep. 10, 2024 (11 pages).
(Continued)

*Primary Examiner* — Parth Patel
(74) *Attorney, Agent, or Firm* — Foley & Lardner LLP

(57) ABSTRACT

Presented are systems and methods for wireless communication. In one aspect, a first wireless communication device determines information of a side-link positioning reference signal (S-PRS). In one aspect, the first wireless communication device sends, to a second wireless communication device, side-link control information (SCI) according to the information of the S-PRS. The first wireless communication device may communicate with the second wireless communication device, the S-PRS according to the information of the S-PRS.

18 Claims, 22 Drawing Sheets

(56) References Cited

U.S. PATENT DOCUMENTS

| | | | | |
|---|---|---|---|---|
| 2023/0050447 | A1 | 2/2023 | Ren et al. | |
| 2023/0052126 | A1* | 2/2023 | Nam | H04L 5/00 |
| 2023/0094751 | A1* | 3/2023 | Nam | H04W 4/029 370/329 |
| 2023/0096178 | A1* | 3/2023 | Wu | H04W 72/51 370/329 |
| 2023/0224121 | A1* | 7/2023 | Ganesan | H04L 5/0051 455/456.1 |
| 2023/0397150 | A1* | 12/2023 | Baek | H04L 5/0051 |
| 2024/0098757 | A1* | 3/2024 | Yu | H04L 5/0051 |
| 2024/0113837 | A1* | 4/2024 | Hosseini | H04L 5/0053 |
| 2024/0188100 | A1* | 6/2024 | Zhang | H04L 5/0094 |
| 2024/0291534 | A1* | 8/2024 | Ko | H04L 5/0048 |
| 2025/0133481 | A1* | 4/2025 | Basu Mallick | H04W 48/12 |

FOREIGN PATENT DOCUMENTS

| | | | |
|---|---|---|---|
| WO | WO-2021/129060 | A1 | 7/2021 |
| WO | WO-2022/165835 | A1 | 8/2022 |
| WO | WO-2023/055542 | A1 | 4/2023 |

OTHER PUBLICATIONS

Interdigital, "Positioning Enhancements for R18", 3GPP RAN Rel-18 Workshop, RWS-210429, Jul. 2, 2021 (3 pages).

International Search Report and Written Opinion for PCT Appl. No. PCT/CN2021/125610, mailed Jun. 15, 2022 (10 pages).

Apple Inc., "On Rel-18 Positioning", 3GPP TSG RAN Meeting #93-e, RP-212368, Sep. 17, 2021, Electronic Meeting (6 pages).

LG Electronics, "Discussion and proposed changes for positioning for V2X and public safety", 3GPP TSG RAN Meeting #93-e, RP-212036, Sep. 17, 2021, Electronic Meeting (3 pages).

LG Electronics, "Enhancement for positioning", 3GPP TSG RAN RAN Rel-18 workshop, RWS- 210245, Jul. 2, 2021, Agenda Item 4.3, Electronic Meeting (9 pages).

Qualcomm, "Views on Positioning Evolution for Rel-18" 3GPP TSG RAN meeting #93e, RP-212045, A.I. 9.0.2, Sep. 17, 2021, Electronic Meeting (9 pages).

Robert Bosch GMBH, "On support of sidelink Positioning in Rel-18" 3GPP TSG-RAN Meeting #93- e, RP-212294, Sep. 17, 2021, Electronic Meeting (6 pages).

Zte et al., "Evolution of NR positioning in Rel-18", 3GPP TSG RAN Meeting #93-e, RP-212381, Sep. 17, 2021, Electronic Meeting (13 pages).

Office Action for CA Appl. No. 3,221,377 dated Nov. 24, 2025 (4 pages).

Office Action for KR Appl. No. 10-2023-7040707, dated Jan. 5, 2026 (with English translation, 8 pages).

* cited by examiner

SYSTEMS AND METHODS FOR SIDE-LINK COMMUNICATION FOR POSITIONING INFORMATION

CROSS-REFERENCE TO RELATED APPLICATION

This application claims the benefit of priority under 35 U.S.C. § 120 as a continuation of International Patent Application No. PCT/CN2021/125610, filed on Oct. 22, 2021, the disclosure of which is incorporated herein by reference in its entirety.

TECHNICAL FIELD

The disclosure relates generally to wireless communications, including but not limited to systems and methods for communicating positioning information through a side-link.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium for wireless communication between two wireless communication devices through a side-link. In some embodiments, each of the two wireless communication devices is user equipment (UE).

In some embodiments, a first wireless communication device determines information of a side-link positioning reference signal (S-PRS). In some embodiments, the first wireless communication device is a UE or a multiple-transmission point (TRP). In some embodiments, the first wireless communication device sends, to a second wireless communication device, side-link control information (SCI) according to the information of the S-PRS. In some embodiments, the information of the S-PRS is included in the SCI. In some embodiments, the information of the S-PRS is indicated by one or more parameters of the SCI, and the SCI can be obtained or generated according to the information of the S-PRS. In some embodiments, the receiver of the SCI can obtain the information of the SCI according to the SCI.

In some embodiments, the first wireless communication device communicates with the second wireless communication device, the S-PRS according to the information of the S-PRS. In some embodiments, the first wireless communication device receives the S-PRS transmitted by the second wireless communication device according the information of the S-PRS. In some embodiments, the first wireless communication device transmits the S-PRS to the second wireless communication device according the information of the S-PRS. In some embodiments, the SCI includes an indication of an S-PRS resource. In some embodiments, the S-PRS resource includes at least one of the S-PRS time, frequency, sequence, code domain parameter. In some embodiments, the S-PRS resource is the scheduling unit of the S-PRS. In some embodiments, the SCI includes an indication of an S-PRS resource and a time parameter of the S-PRS resource. In some embodiments, the time parameter comprises at least one of: a period, a number of periods, a period index of a current period among multiple periods, a starting time of the S-PRS, an indication of whether the current period is a starting period, an offset between a slot where the S-PRS starts and a current slot of the S-PRS, an indication of whether the S-PRS starts before a current set of Q periods, an indication of whether the S-PRS starts before the current period, an index of a first slot of the S-PRS in a previous set of Q periods, or an indication of whether the S-PRS starts later than a first slot of the previous set of Q periods, where the Q is an integer value equal to or larger than 1.

In some embodiments, the indication of the S-PRS resource comprises at least one of: number of S-PRS resources, an index of the S-PRS resource, an index of an associated S-PRS resource set, or an index of an associated S-PRS resource pool. In some embodiments, the S-PRS refers to/corresponds to one of an S-PRS resource, an S-PRS resource set, or an S-PRS resource pool. In some embodiments, the S-PRS resource is configured by higher layer signaling with at least one of: a frequency span of the S-PRS resource, time domain information of the S-PRS resource, a parameter to be used to generate a bit sequence for the S-PRS resource, an S-PRS pattern of the S-PRS resource, a period of the S-PRS resource, number of periods of the S-PRS resource, a number of S-PRS resource occasions in one period, a gap between two consecutive occasions of the S-PRS resource, a comb size, a comb offset, or an identification of a side-link wireless communication device that transmits the S-PRS in the S-PRS resource.

In some embodiments, an S-PRS resource set or pool associated with the S-PRS resource is configured by higher layer signaling with at least one of: a comb size, a span of a physical resource block (PRB), a slot index, an index of symbol in a slot, a period, number of occasions in one period, a gap between consecutive occasions, an identification of a side-link wireless communication device that transmits the S-PRS of S-PRS resources in the S-PRS resource set or pool, or a parameter to be used to generate a bit sequence for S-PRS resources in the S-PRS resource set or pool.

In some embodiments, the SCI comprises: a first stage SCI, or an SCI in a physical side-link control channel (PSCCH).

In some embodiments, a first type of information of the S-PRS is associated with a parameter of the SCI, and the parameter of the SCI comprises a parameter of a channel that includes the SCI, instead of explicitly using bits in the SCI to indicate the first type of information. In some embodiments, the parameter of the channel comprises at least one of: a slot index of the channel, an orthogonal frequency division multiplexing (OFDM) symbol index of the channel, a physical resource block (PRB) index of the channel, or an SCI format of the SCI, and where the channel includes a physical side-link control channel (PSCCH) or a physical side-link shared channel (PSSCH). In some embodiments, the first type of information of the S-PRS is determined according to the parameter of the SCI, only if the SCI includes a bit field to indicate that the SCI triggers the S-PRS.

In some embodiments, the information of the S-PRS and a parameter of a physical side-link control channel (PSSCH) have an associated relationship. In some embodiments, the information of the S-PRS can be obtained according to the parameter the PSSCH. In some embodiments, the parameter the PSSCH can be obtained according to the information of the S-PRS. In some embodiments, the information of the S-PRS is configured according to the parameter of the PSSCH. In some embodiments, the associated relationship includes at least one of: the information of the S-PRS is associated with one occasion of the PSSCH; an occasion of the S-PRS is associated with occasions of the PSSCH; and a period of the S-PRS is associated with a period of the PSSCH. In some embodiments, the associated relationship includes one of: an occasion of the S-PRS is in one occasion of the PSSCH; occasions of the S-PRS are same as occasions of the PSSCH; and a period of the S-PRS is same as a period of the PSSCH. In some embodiments, one period comprises one or more occasions.

In some embodiments, the SCI includes a bit field that is used to select one of: only the S-PRS, only a physical side-link control channel (PSSCH), or both the S-PRS and the PSSCH.

In some embodiments, the SCI includes: a first set of bit fields corresponding to the S-PRS, and a second set of bit fields corresponding to a physical side-link control channel (PSSCH). In some embodiments, the first set of bit fields indicates at least one of: an occasion of the S-PRS, or a period of the S-PRS.

In some embodiments, the first set of bit fields indicates the occasion of the S-PRS and the second set of bit fields indicates an occasion of the PSSCH and a period of the PSSCH, and that a period of the S-PRS and the period of the PSSCH are same. In some embodiments, the period of the PSSCH can be named period of the PSSCH and the S-PRS. In some embodiments, the first set of bit fields indicates the period of the S-PRS, and the second set of bit fields indicates the occasion of the PSSCH and the period of the PSSCH, and that the occasion of the S-PRS is in occasions of the PSSCH. In some embodiments, the first set of bit fields indicates the occasion of the S-PRS and the period of the S-PRS, and the second set of bit fields indicates the occasion of the PSSCH and the period of the PSSCH. In some embodiments, the occasion and the period of the PSSCH and the S-PRS are indicated respectively and are independent. In some embodiments, the first set of bit fields and the second set of bit fields include same bit fields. In some embodiments, the same bit fields include information of S-PRS and information of PSSCH, where the information of S-PRS and the information of PSSCH are independent. In some embodiments, the same bit fields are configured with or correspond to both the information of the PSSCH and the information of the S-PRS.

In some embodiments, the SCI only can be located in a first region. In some embodiments, the first wireless communication device determines the information of the S-PRS by determining a candidate S-PRS resource set. In some embodiments, the first wireless communication device determines the information of the S-PRS by monitoring SCI transmitted by a third communication device in the first region in a time window. In some embodiments, the first wireless communication device determines the information of the S-PRS by determining an S-PRS resource selected by the third communication device, according to the monitored SCI transmitted by the third communication device. In some embodiments, the first wireless communication device determines the information of the S-PRS by deleting some S-PRS resources from the candidate S-PRS resource set based on the determined S-PRS resource selected by the third communication device. In some embodiments, the first wireless communication device determines the information of the S-PRS by selecting an S-PRS resource from remaining S-PRS resources in the candidate S-PRS resource set. In some embodiments, the first wireless communication device determines the information of the S-PRS by determining the information of the S-PRS according to the S-PRS resource selected from the remaining S-PRS resources. In some embodiments, the first wireless communication device receives a first signaling which includes a first parameter about the first region.

In some embodiments, the SCI provides/includes/is associated with the information of the S-PRS, and is independent from another SCI that provides information of a physical side-link control channel (PSSCH). In some embodiments, the SCI is located only in a first region and the another SCI is located only in a second region. In some embodiments, the first region does not overlap with the second region. In some embodiments, the first region is a subset of the second region.

In some embodiments, the first region includes a first set of sub-channels and the second region includes a second set of sub-channels. In some embodiments, the first region includes a first set of slots and the second region includes a second set of slots. In some embodiments, the first region includes a first set of resource elements (REs) in a sub-channel and the second region includes a second set of REs in the sub-channel. In some embodiments, the first region includes a first side-link resource pool and the second region includes a second side-link resource pool.

In some embodiments, the first wireless communication device receives a first signaling which includes a first parameter about the SCI and a second signaling which includes a second parameter of the another SCI. In some embodiments, the first wireless communication device receives a third signaling which indicates a relationship between the SCI and the another SCI.

In some embodiments, the first parameter includes at least one of: an orthogonal frequency division multiplexing (OFDM) location of a PSCCH of the SCI, number of physical resource blocks (PRBs) occupied by the PSCCH, a PRB location of the PSCCH, demodulation reference signal (DMRS) information of the PSCCH, number of reserved bits of the SCI, a parameter of a sub-channel corresponding to the PSCCH, a parameter of a sub-channel where the SCI can be located, a parameter of a slot where the SCI can be located, or a parameter of resource elements (REs) in one sub-channel where the SCI can be located.

In some embodiments, the second parameter includes at least one of an orthogonal frequency division multiplexing (OFDM) location of a PSCCH of the another SCI, number of physical resource blocks (PRBs) occupied by the PSCCH, a PRB location of the PSCCH, demodulation reference signal (DMRS) information of the PSCCH, number of reserved bits of the another SCI, parameter of sub-channel corresponding to the PSCCH, a parameter of a sub-channel where the another SCI can be located, a parameter of a slot where the another SCI can be located, or a parameter of a resource elements (REs) in one sub-channel where the another SCI can be located.

In some embodiments, the first signaling and the second signaling correspond to two PSCCHs in one side-link resource pool. In some embodiments, the first signaling and the second signaling correspond to two PSCCHs in one sub-channel in one side-link resource pool. In some embodiments, the first signaling and the second signaling correspond to two side-link resource pools. In some embodiments, the first signaling and the second signaling correspond to two sets of parameters of one PSCCH.

In some embodiments, the third signaling includes one of an orthogonal frequency division multiplexing (OFDM) offset between the SCI and the another SCI, or a physical resource blocks (PRB) offset between the SCI and the another SCI. In some embodiments, the SCI and the another SCI are in different sub-channels. In some embodiments, when the SCI and the another SCI are in one sub-channel, the SCI and the another SCI are transmitted by a same wireless communication device.

In some embodiments, a periodicity of the SCI is different from a periodicity of the S-PRS.

In some embodiments, the information of the S-PRS includes at least one of: a period of the S-PRS, number of periods, an index of a current Q period among multiple Q periods, a period index of a current period, an index of slot where the S-PRS starts, an offset between a slot where the S-PRS starts and a current slot of the S-PRS, an indication of whether the S-PRS starts before a current Q period, an indication of whether the S-PRS starts before the current period, an index of a first slot of the S-PRS in a previous Q period, an indication of whether the S-PRS starts later than a first slot of at least one previous Q periods, or an indication of whether a PRS measurement result is to be reported.

In some embodiments, the S-PRS is transmitted in an occasion without the SCI.

In some embodiments, the first wireless communication device determines the information of the S-PRS according to a received downlink control information (DCI). In some embodiments, the received DCI includes an indication that a PRS measurement result is reported via a side-link or a Uu link. The Uu link may be a link between UE and a base station. In some embodiments, the SCI includes an indication of whether a PRS measurement result is to be reported.

In some embodiments, the SCI includes an indication that a PRS measurement result is to be reported via a side-link or a Uu link. In some embodiments, the first or second wireless communication device receives the S-PRS via a side-link. In some embodiments, the first or second wireless communication device sends to a wireless communication node, a measurement result of the S-PRS via a Uu link. The wireless communication node may be a base station. In some embodiments, the first or second wireless communication device receives a measurement result of the S-PRS from another wireless communication device via a side-link. In some embodiments, the first or second wireless communication device sends the measurement result to a wireless communication node via a Uu link, or to a target wireless communication device via a side-link. The wireless communication node may be a base station and the target wireless communication device may be a third terminal device.

In some embodiments, the first or second wireless communication device determines a parameter of a side-link feedback channel. In some embodiments, the parameter of the side-link feedback channel may indicate which channel to use. In some embodiments, the first or second wireless communication device determines the parameter of the side-link feedback channel according to at least one of: the information of the S-PRS, a parameter of the SCI triggering the S-PRS, an identification of a side-link wireless communication device that reported a measurement result of the S-PRS, an identification of a side-link wireless communication device that receives the measurement result, an identification of the first wireless communication device, an identification of the second wireless communication device, or a parameter of S-PRS resources selected by the side-link wireless communication device that reported a measurement result of the S-PRS.

The systems and methods presented herein include a novel approach for communicating positioning information through a side-link. In some embodiments, a first communication device determines information of S-PRS. In some embodiments, the first communication device sends SCI according to the information of S-PRS. In some embodiments, the first communication device sends or receives the S-PRS according to the information of the S-PRS. In some embodiments, the information of the S-PRS is indicated by one or more parameters of the SCI, and the SCI can be obtained according to the information of the S-PRS. In some embodiments, some parameter of channel including the SCI can be associated with the information of the S-PRS.

In some embodiments, the SCI includes/specifies an indication/index of an S-PRS resource. The S-PRS resource may be a time-frequency resource. In some embodiments, the SCI includes an indication of an S-PRS resource, and a time/frequency parameter of the S-PRS resource. The S-PRS resource may include at least one of the S-PRS time, frequency, sequence, code domain parameter. In some embodiments, the S-PRS resource is the scheduling unit of the S-PRS. For example, the SCI can include at least one of the period of the S-PRS resource, or the number of periods of the S-PRS resource, a period index of a current period, the starting time of the transmitted S-PRS, or whether the current period is a starting period. In some embodiments, the indication of the S-PRS resource includes the number of S-PRS resources, an S-PRS resource index, an S-PRS resource set index, or an S-PRS resource pool index.

In some embodiments, each S-PRS resource or S-PRS resource set/pool is configured by higher layer signaling with (e.g., using or according to) the period of the S-PRS resource and/or the number of periods of the S-PRS resource. In some embodiments, each S-PRS resource or S-PRS resource set/pool is configured by higher layer with the period of the S-PRS resource, the repetition number of the S-PRS resource in one period and/or the gap between two consecutive repetitions of the S-PRS resource.

In some embodiments, information of S-PRS includes information of one of a PRS resource, a PRS resource set, or a PRS resource pool. In some embodiments, the SCI is first stage SCI. In some embodiments, the SCI is an SCI in a PSCCH.

In some embodiments, a first type information of S-PRS is associated with a parameter of SCI, instead of explicitly using bits in the SCI to indicate the first type of information. In some embodiments, the parameter of SCI includes a parameter of a channel including the SCI. In some embodiments, the channel includes a PSCCH or PSSCH. In some embodiments, the first type information of S-PRS is determined according to the parameter of SCI only if the SCI includes a bit field to inform that it triggers the S-PRS.

In some embodiments, the information of S-PRS and parameter(s) of PSSCH have a corresponding/correspondence relationship. In some embodiments, the SCI includes the parameter(s) of PSSCH.

In some embodiments, the SCI includes a bit field which is used to inform/select/identify one value from a set of values, for example, {only S-PRS, only PSSCH, or both S-PRS and PSSCH}. In some embodiments, when the SCI includes the bit field which informs both S-PRS and PSSCH, the SCI includes two sets of bit fields corresponding to S-PRS and PSSCH respectively. In some embodiments, some information of S-PRS and some information of PSSCH have a corresponding/correspondence relationship.

In some embodiments, the SCI which provides information of the S-PRS, and a second SCI that provides information/parameter(s) of PSSCH, are two independent SCIs. In some embodiments, the period of SCI and the period of S-PRS are different. In some embodiments, S-PRS is transmitted without the SCI.

In some embodiments, the information of the S-PRS is determined according to a received DCI from a third communication device. In some embodiments, the DCI includes information indicating the PRS measurement result is reported in side-link or Uu link.

In some embodiments, the SCI includes information indicating to report a PRS measurement result. In some embodiments, the SCI includes information indicating that the PRS measurement result is reported in a side-link or Uu link.

In some embodiments, a UE receives S-PRS in side-link and can feedback the measurement of S-PRS to gNB using a Uu-link. In some embodiments, the UE reports an S-PRS measurement result of other UE(s) to a gNB/LMF/target UE. In some embodiments, UE2 or UE1 gets or receives a parameter of a side-link feedback channel. The parameter may indicate which channel to use. In some embodiments, UE2 or UE1 gets or receives the parameter of side-link feedback channel according to at least one of: an information of S-PRS, a parameter of SCI triggering S-PRS, UE identification of UE2 who reports the S-PRS measurement result, or UE identification of UE1 who receives the report, or information included in an SCI.

In some embodiments, each S-PRS resource group is associated with an S-PRS information respectively, and may not employ SCI.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
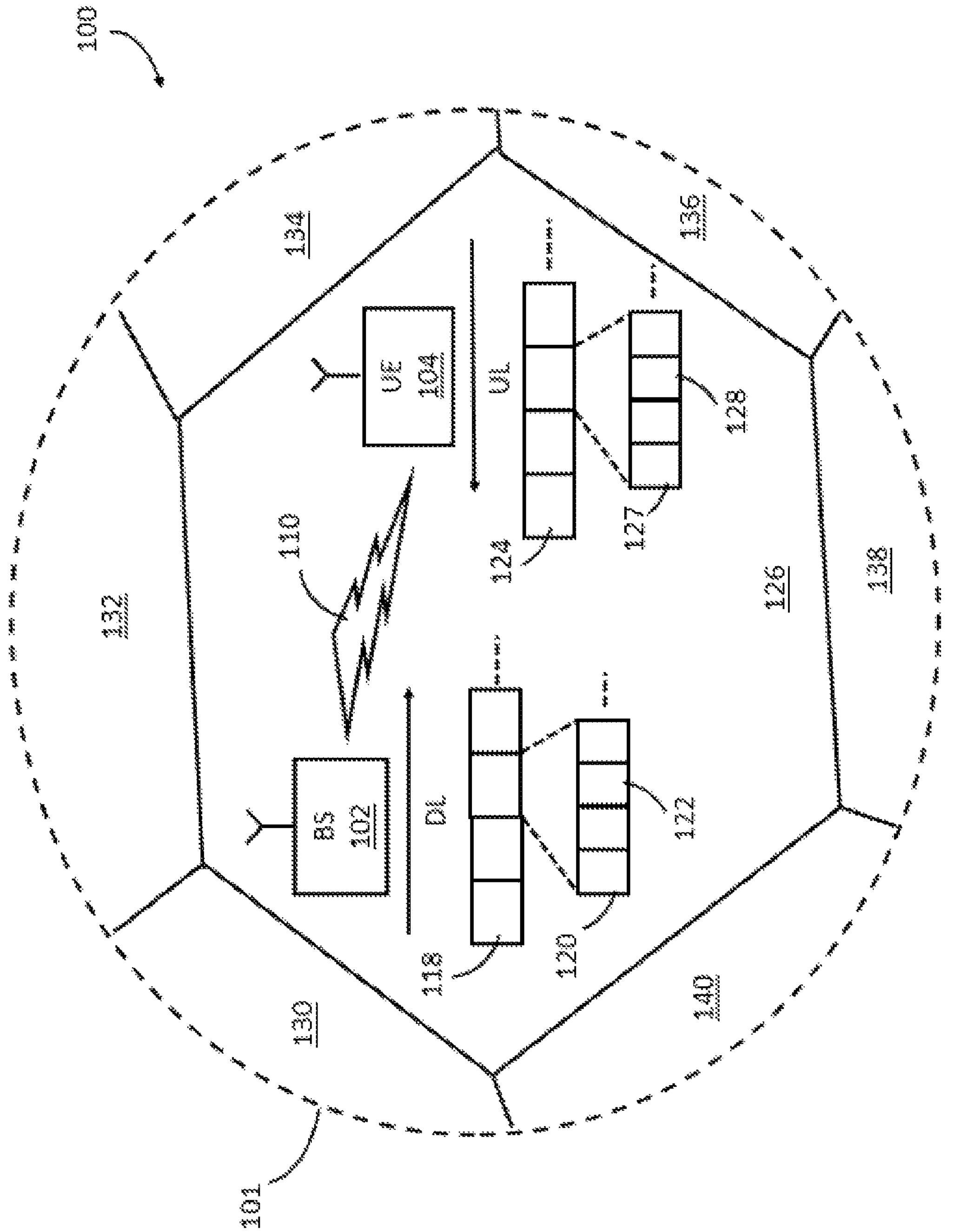
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
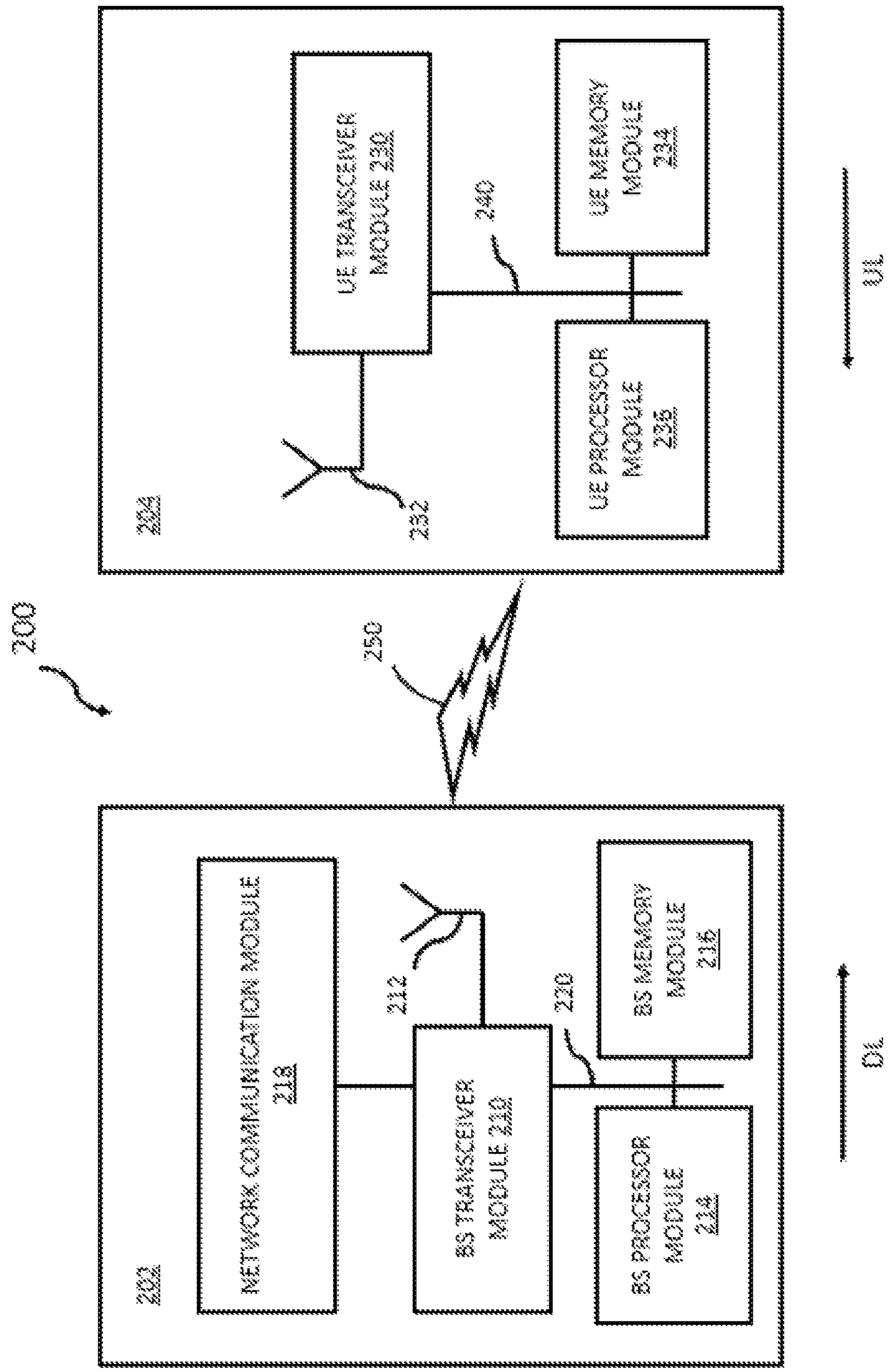
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication link 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232.

In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 230 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Communicating Positioning Information Through Side-Link The side-link has advantage of short distance and simple communication channel. It can refine the positioning and provide high accuracy positioning information. In addition, some relative positioning can be determined based on a side-link.

Example 1

Figure 3:
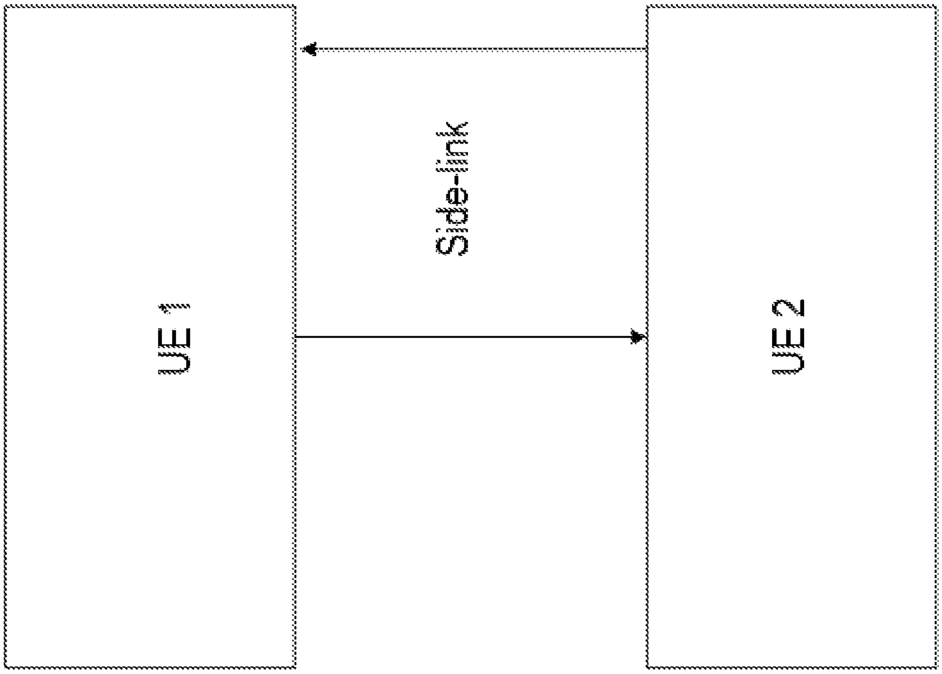
FIG. 3 illustrates an example communication network with two UEs communicating over a side-link, in accordance with some embodiments of the present disclosure, in accordance with some embodiments of the present disclosure.

Referring now to FIG. 3, depicted is an example communication network with UE1 and UE2, in accordance with some embodiments of the present disclosure. Each UE may be the UE 104 of FIG. 1. In some embodiments, the example communication network may include additional UE(s) than that shown in FIG. 3 or can include a TRP instead of a UE.

In one aspect, the side-link includes a communication link between two UEs. The side-link control information (SCI) may include information of positioning reference signal S-PRS transmitted through the side-link. S-PRS may refer to a PRS transmitted in a side-link. In one aspect, the SCI is a physical layer signaling. If UE1 transmits S-PRS, the UE1 also transmits SCI including or according to information of positioning reference signal (PRS). There may be several approaches to inform/provide the information of S-PRS. For example, the information of S-PRS can be informed or provided through a higher layer signaling for a S-PRS resource/S-PRS resource set/S-PRS resource pool, and the SCI indicating the indication of the S-PRS resource/S-PRS resource set/S-PRS resource pool. A higher layer signaling herein refers to signaling over layer 2/layer 3. Examples of higher layer signaling include at least one of: radio resource control (RRC) signaling, medium access control control element (MAC-CE) signaling, LPP (LTE positioning protocol) signaling, or other signaling which isn't physical layer signaling.

In one approach, the SCI includes an indication of an S-PRS resource. For example, the SCI includes at least one piece of information: the number of S-PRS resources, an S-PRS resource index, an S-PRS resource set index, and/or an S-PRS resource pool index. The S-PRS resource is the granularity (e.g., smallest unit size) of scheduling S-PRS. One S-PRS resource set may include one or more S-PRS resources, where one S-PRS resource pool may include one or more S-PRS resource sets. Each PRS resource may be configured by higher layer signaling with some parameter of the S-PRS resource. For example, each S-PRS resource may be configured by higher layer signaling with at least one of: a frequency span/range of the S-PRS resource, time domain information of the S-PRS resource, a parameter used to generate a bit sequence for the S-PRS resource, or an S-PRS pattern of the S-PRS resource. The time domain information of the S-PRS resource may include at least one of an index of symbols where the S-PRS resource locates (e.g., occupies, occurs, resides) in a slot, the index of slot(s) where the S-PRS resource locates, the period of the S-PRS resource, the number of periods of the S-PRS resource, the repetition number of the S-PRS resources. The frequency span of the S-PRS resource may include physical resource block (PRB) set(s) occupied by the S-PRS resource. The resource elements (REs) occupied by the S-PRS resource belong to the PRB set. The parameter used to generate bit sequence for the S-PRS resource may include information to generate a sequence of bits for the S-PRS resource. The S-PRS pattern of the S-PRS resources may include at least one of comb size or comb offset.

Figure 4:
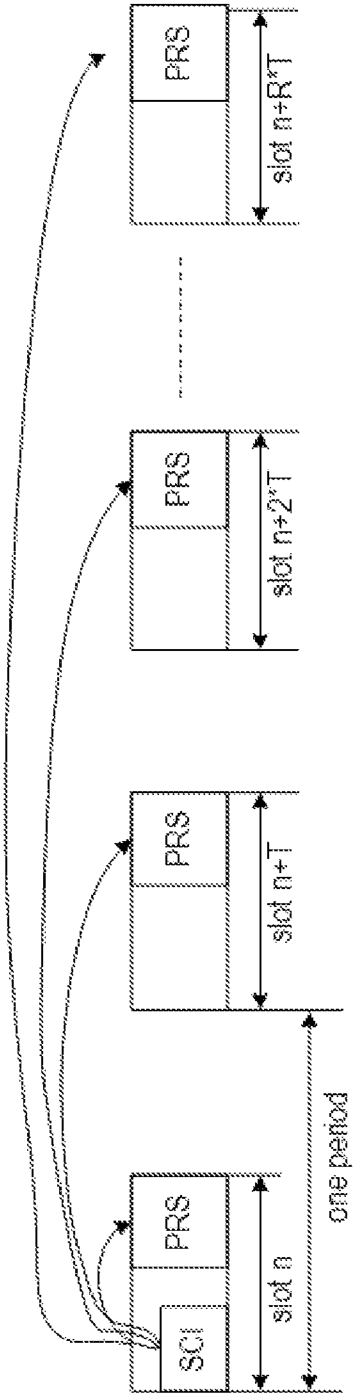
FIG. 4 illustrates an example of SCI including an indication of S-PRS resource where S-PRS resource is configured parameter of period by higher layer signaling, in accordance with some embodiments of the present disclosure.

FIG. 4 illustrates an example of SCI including an indication of S-PRS resource where S-PRS resource is configured parameter of period by higher layer signaling, in accordance with some embodiments of the present disclosure. In some embodiments, as shown in FIG. 4, an SCI may include an S-PRS resource index. Each S-PRS resource may be configured by higher layer signaling with the period of the S-PRS resource and/or the number of periods of the S-PRS resource.

Figure 5:
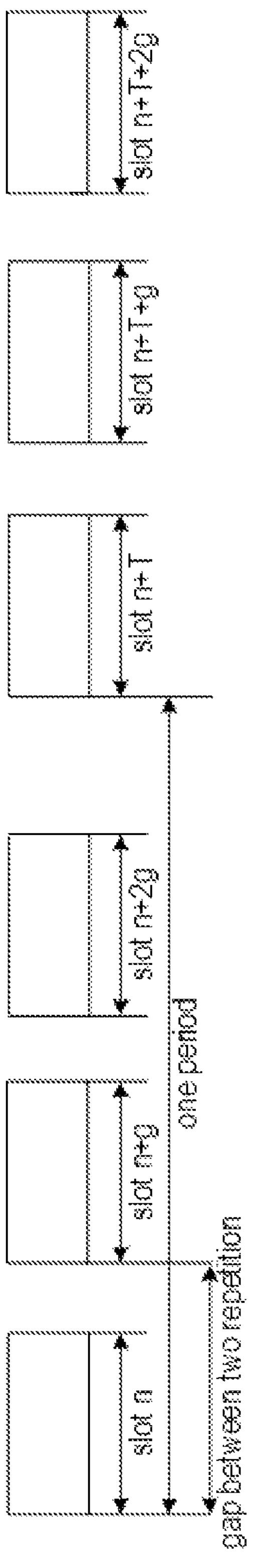
FIG. 5 illustrates an example of SCI including an indication of S-PRS resource where each S-PRS resource is configured parameter of period and parameter of occasion by higher layer signaling, and one period of the S-PRS includes one or more occasion of the S-PRS, in accordance with some embodiments of the present disclosure.

FIG. 5 illustrates an example of SCI including an indication of S-PRS resource where each S-PRS resource is configured parameter of period and parameter of occasion by higher layer signaling, and one period of the S-PRS includes one or more occasion of the S-PRS, in accordance with some embodiments of the present disclosure. In FIG. 5, each S-PRS resource may be configured by higher layer with the period of the S-PRS resource, the repetition number of the S-PRS resource in one period and/or the gap between two consecutive repetitions of the S-PRS resource. One period may include one or more repetitions. The S-PRS may start from a slot corresponding to a slot of the SCI. For example, the S-PRS starts in the same slot of the SCI including/having the S-PRS resource index. The S-PRS may start from a slot after the slot of SCI. The offset between the slot of S-PRS and the slot of SCI may be configured by higher layer signaling, predetermined, or indicated in the SCI. In one aspect, part of information of the S-PRS resource may be configured per S-PRS resource set/pool. This part of information may be applied to all S-PRS resources in the S-PRS resource set/pool.

In one approach, if a UE attempts to transmit an S-PRS, the UE may determine a set of candidate S-PRS resources. Then the UE may monitor for SCI transmitted by other UEs and can determine S-PRS resources selected by the other UEs. The UE may remove, exclude, or delete S-PRS resources selected by the other UE from the set of candidate S-PRS resources. Then, the UE may select S-PRS resources from the remaining candidate time resources of the set. The UE may monitor for SCI in each monitoring occasion in a time window to determine the time resources selected by the other UE. Alternatively, the UE may monitor for SCI in each monitoring occasion of a first region in a time window to determine the time resources selected by the other UE, where the first region may be configured by higher layer signaling. For example, the UE may monitor for SCI in each monitoring occasion of slot 4n in a time window to determine the time resources selected by the other UE, where n is any integer equal to or larger than 0. For determining the S-PRS resources selected by the other UE, the UE may not monitor SCI in each monitoring occasion of slot 4n+1, 4n+2, 4n+3 in the time window to determine the S-PRS resources selected by the other UE. By bypassing or omitting monitoring for SCI for slot 4n+1, 4n+2, 4n+3, the UE may reduce power consumption and save computational resources. In some embodiments, because of the bandwidth requirement of the S-PRS, the S-PRS only can be transmitted in some region corresponding to the first region.

Figure 6:
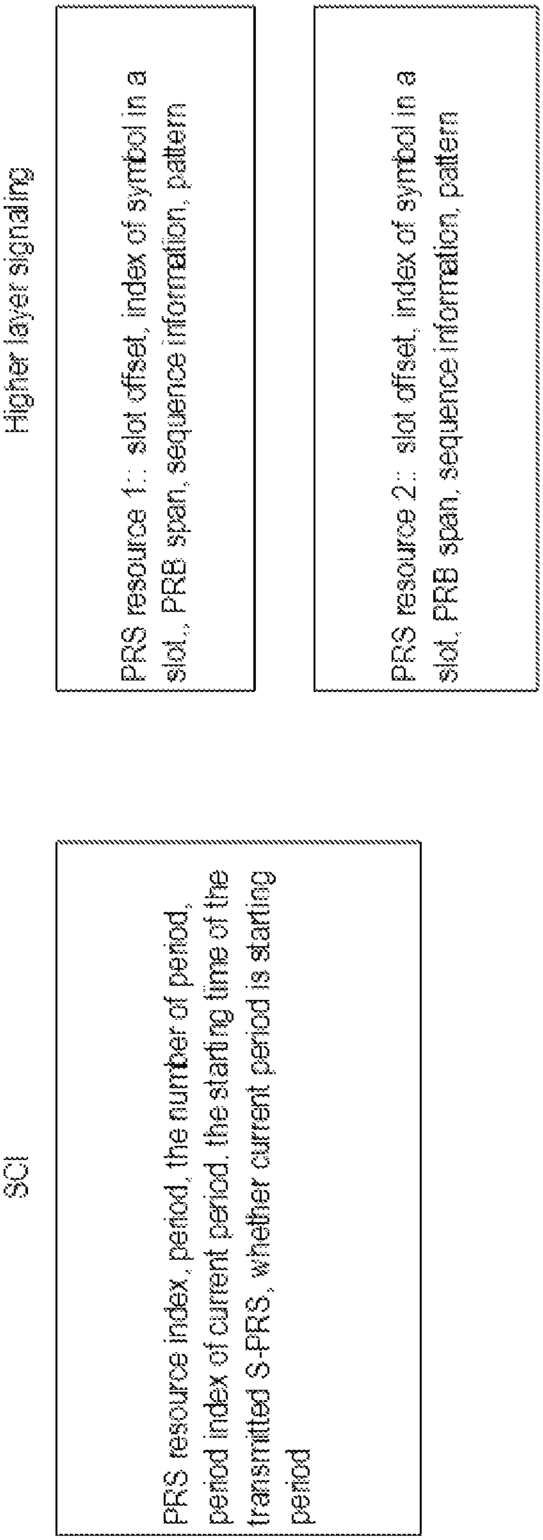
FIG. 6 illustrates examples of SCI including indication of S-PRS resource and time parameter of the S-PRS resource where each S-PRS resource is configured with one or more parameters by higher layer signaling, in accordance with some embodiments of the present disclosure.

FIG. 6 illustrates examples of SCI including indication of S-PRS resource and time parameter of the S-PRS resource where each S-PRS resource is configured with one or more parameters by higher layer signaling, in accordance with some embodiments of the present disclosure. In one approach, the SCI includes not only the S-PRS resource indication but also some time/frequency information of the S-PRS resource. For example, the SCI includes at least one of the period of the S-PRS resource, the number of periods of the S-PRS resource, a period index of current period among multiple periods, the starting time of the transmitted S-PRS, or whether the current period is a starting period. In one aspect, these information are not configured by the higher layer signaling for each S-PRS resource, but may be included in SCI as shown in FIG. 6. Because the available time/frequency resource for the S-PRS resource is selected by a UE based on a monitoring and selecting principle, the available time/frequency resource for the S-PRS resource may depend on the time/frequency resource occupied by other UEs in the side-link. The UE can adopt the period of its transmitted S-PRS dynamically according to the available time/frequency resource based on the monitoring and selecting principle. For example, the UE who transmits the S-PRS resources can inform other UE(s) about the time resources selected by it.

If a UE attempts to transmit an S-PRS, the UE may determine a set of candidate time resources for the S-PRS. Then the UE may monitor for SCI transmitted by other UEs and can determine time resources selected by the other UEs. The UE may remove, exclude, or delete time resources selected by the other UE from the set of candidate time resources. Then the UE may select time resources from the remaining candidate time resources of the set. The UE may monitor for SCI in each monitoring occasion in a time window to determine the time resources selected by the other UE. Alternatively, the UE may monitor for SCI in each monitoring occasion of the first region in a time window to determine the time resources selected by the other UE, where the first region may be configured by higher layer signaling. For example, the UE may monitor for SCI in each monitoring occasion of slot 4n in a time window to determine the time resources selected by the other UE, where n is any integer equal to or larger than 0. For determining the time resources selected by the other UE, the UE may not monitor for SCI in each monitoring occasion of slot 4n+1, 4n+2, 4n+3 in the time window to determine the time resources selected by the other UE. By bypassing or omitting monitoring for SCI for slot 4n+1, 4n+2, 4n+3, the UE may reduce power consumption and save computational resources. In some embodiments, because of the bandwidth requirement of the S-PRS, the S-PRS only can be transmitted in some region corresponding to the first region.

Figure 7:
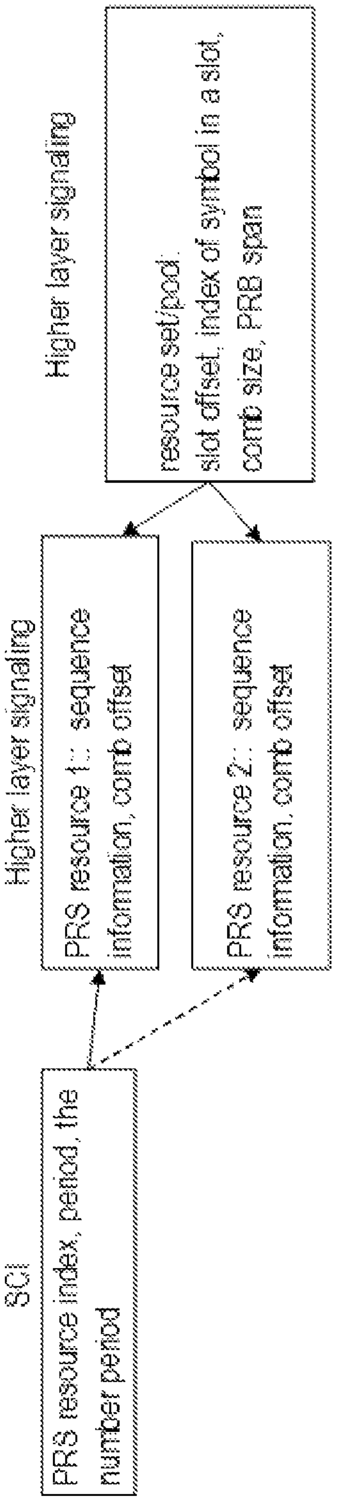
FIG. 7 illustrates examples of SCI including indication of S-PRS resource and time parameter of the S-PRS resource where each S-PRS resource is configured with one or more parameters by higher layer signaling and one or more parameters of the S-PRS are configured for a S-PRS resource set/pool, in accordance with some embodiments of the present disclosure.

FIG. 7 illustrates examples of SCI including indication of S-PRS resource and time parameter of the S-PRS resource where each S-PRS resource is configured with one or more parameters by higher layer signaling and one or more parameters of the S-PRS are configured for a S-PRS resource set/pool, in accordance with some embodiments of the present disclosure. In one approach, similar principle(s) can be applied to an S-PRS resource set/pool instead of the S-PRS resource. For example, the time/frequency information included in the SCI can be applied to all S-PRS resources in the S-PRS resource set/pool. In some embodiments, some information of S-PRS resources in an S-PRS resource set/pool are the same. As shown in FIG. 7, at least one of the following information may be configured for an S-PRS resource set/pool: comb size, PRB span, slot index, index of symbol in a slot, period, the number of repetitions (e.g., transmission occasions) in one period, or gap between consecutive repetitions. The information configured for the set/pool may be applied to all S-PRS resources in the S-PRS set/pool. A S-PRS pool may include one or more S-PRS sets. In some embodiments, each S-PRS resource only respectively corresponds to a parameter used to generate a bit sequence for the S-PRS resource and comb offset. The information configured for an S-PRS resource set/pool can be configured by higher layer signaling. Alternatively, the information configured for an S-PRS resource set/pool also can be indicated by the SCI.

In some embodiments, the SCI which includes the information of S-PRS is the first stage SCI such as SCI 1-A instead of the second stage SCI such as SCI 2-A/SCI 2-B. The second stage SCI may be included in a PSSCH. The first stage SCI may include information about the second stage SCI. The first stage SCI may include parameter of the second stage SCI. The first stage SCI can be SCI 1-A. The SCI which includes the indication of S-PRS may be an SCI included in a PSCCH. In some embodiments, the monitoring UE can only monitor first stage SCI to determine S-PRS resource selected by other UEs.

Figure 8:
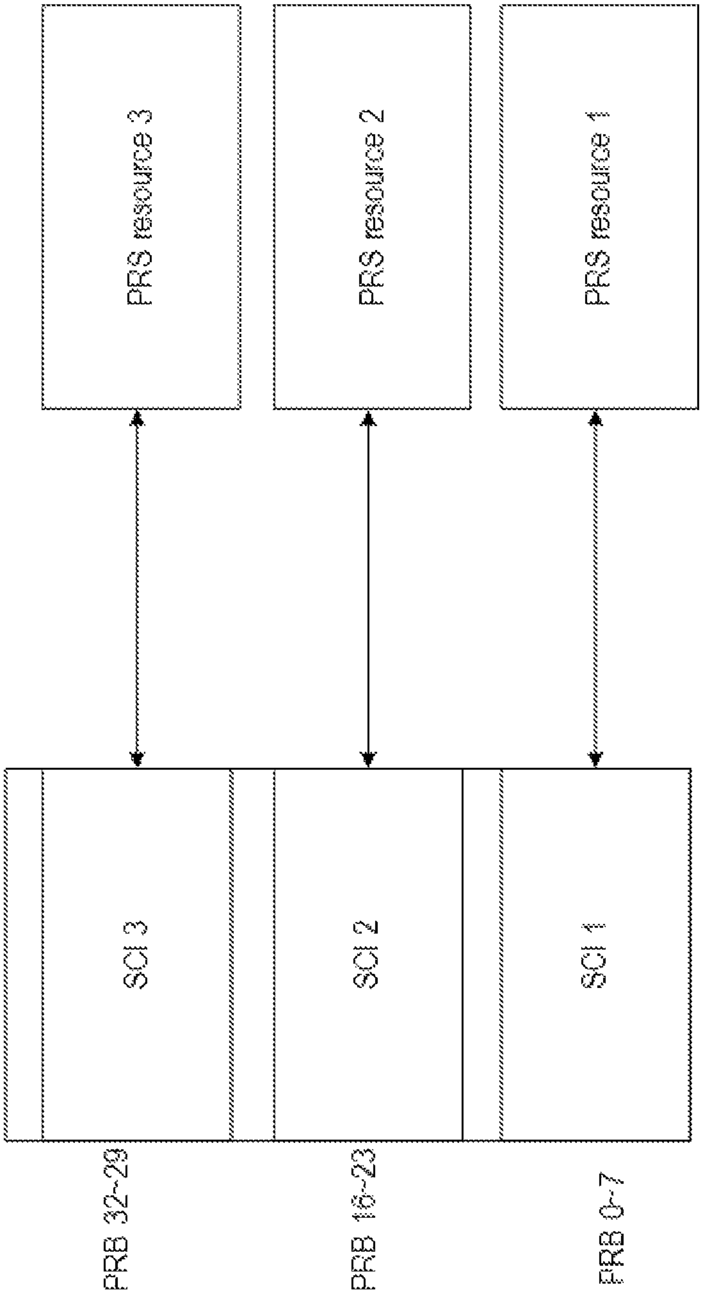
FIG. 8 illustrates examples of PRBs of channel including the SCI corresponding to one S-PRS resource, in accordance with some embodiments of the present disclosure.

FIG. 8 illustrates examples of PRBs of channel including the SCI corresponding to one S-PRS resource, in accordance with some embodiments of the present disclosure. In some embodiments, the information of S-PRS informed by the SCI can be explicitly included in a bit field of the SCI. In some embodiments, the information of S-PRS informed by the SCI can be implicitly associated with some parameter of the SCI, such that one or more bits to inform the information of the S-PRS can be omitted. Accordingly, the number of bits in the SCI can be reduced. For example, a first type of information of S-PRS can be associated with some parameters of the SCI. The SCI may not include a bit field to inform the first type of information of S-PRS explicitly, and the receiver (e.g., UE2) can implicitly determine the first type of information of S-PRS according to the parameter of the SCI. The parameter of the SCI may include a parameter of a PSCCH including the SCI. For example, the parameter of the SCI may include at least one of a slot index of the PSCCH, an OFDM symbol index of the PSCCH, a PRB index of the PSCCH, an SCI format of the SCI, etc. For example, the S-PRS resource index can be associated with the lowest PRB index occupied by the PSCCH including the SCI. Different lowest PRB indexes can be associated with different S-PRS resources as shown in FIG. 8. The first type of information of S-PRS can be a first type of information of an S-PRS resource/set/pool. Examples of the first type of information of the S-PRS resource/set/pool include at least one of: S-PRS resource index, set index, pool index, PRB span, time domain information, comb size, or comb offset.

Figure 9:
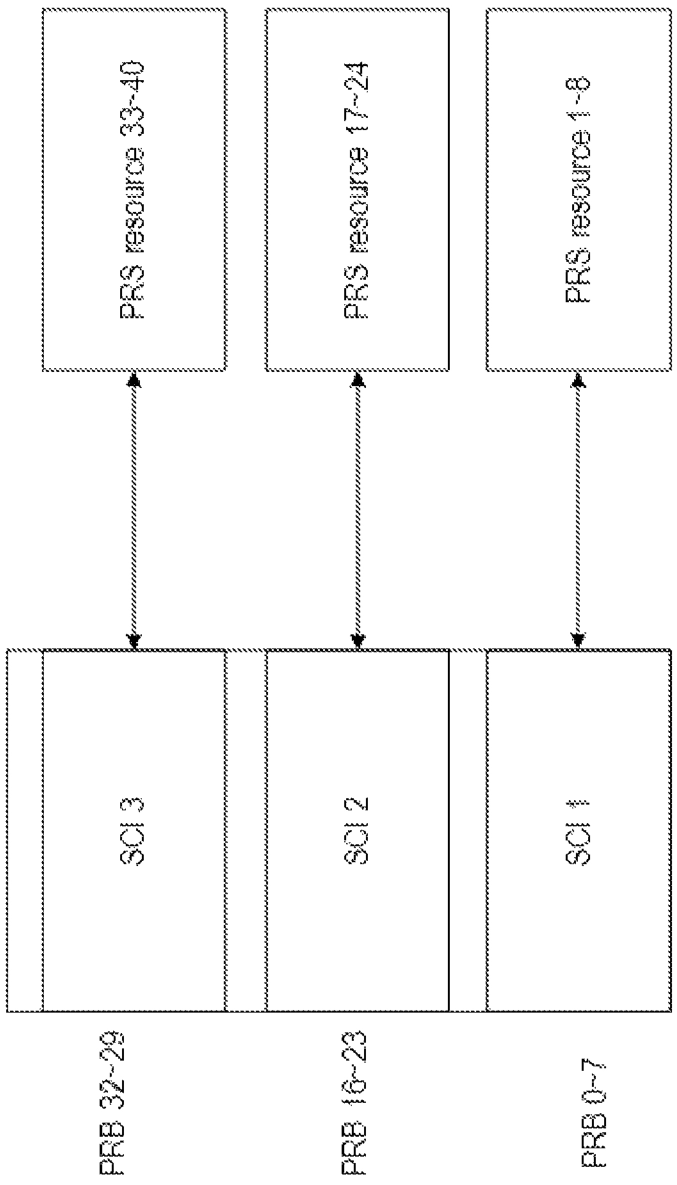
FIG. 9 illustrates examples of PRBs of channel including the SCI corresponding to more than one S-PRS resources and the SCI indicating the selection from the more than one S-PRS resources, in accordance with some embodiments of the present disclosure.

FIG. 9 illustrates examples of PRBs of channel including the SCI corresponding to more than one S-PRS resources and the SCI indicating the selection from the more than one S-PRS resources, in accordance with some embodiments of the present disclosure. In some implementation, one SCI corresponds to multiple values of first type information of S-PRS, and the SCI can further include a bit field to select one value of first type of information from the multiple values of first information of S-PRS. For example, the PSCCH including one SCI may occupy 8 PRBs as shown in FIG. 9, where the 8 PRB corresponds to 8 S-PRS resources. A bit field in the SCI may inform an S-PRS resource selected from the 8 S-PRS resources corresponding to the SCI.

In some implementation, the parameter of the SCI is associated with the first type of information of the S-PRS only if the SCI includes a bit field which informs that an S-PRS resource/set/pool is triggered/included/reserved. If the bit field informs that no S-PRS resource/set/pool is triggered/included/reserved by the SCI, then the parameter of the SCI may not be associated with the first information of the S-PRS.

In some implementation, the parameter of PSSCH including the SCI is associated with the first type of information of the S-PRS in a same way of association between the parameter of the SCI is associated with the first type of information of the S-PRS as described above.

In some implementation, the SCI informing (e.g., carrying, providing) the information of S-PRS, and the SCI informing the information of PSSCH are independent. For example, the SCI informing the information of S-PRS and the SCI informing the information of PSSCH may be two separate SCIs. In some embodiments, the SCI informing the information of S-PRS and the SCI informing the information of PSSCH are in two different SCI formats. In some implementation, the two SCIs are in two PSCCHs. The higher layer signaling can inform relationship between two SCIs. The higher layer signaling can inform respective parameters of two PSCCHs of the two SCIs. For example, the higher layer signaling may inform following parameter for each of the two PSCCHs respectively: an OFDM location of the PSCCH, the number of PRBs occupied by the PSCCH, DMRS information, the number of reserved bits, a sub-channel size, the number X of sub-channels, a sub-channel index where the SCI can be located, or a slot index where the SCI can be located. For example, the two SCIs can be transmitted in different regions. For example, the SCI informing the information of S-PRS can be located in the first region and the SCI informing the information of PSSCH can be located in a second region. The intersection between the first region and the second region may be empty. The higher layer signaling can inform the information about the first region and/or the second region. For example, the SCI informing the information of S-PRS can be located in slot 4n, where n is any integer equal to or larger than 0, and the SCI informing the information of PSSCH can be located in slot 4n+1, 4n+2, 4n+3. The higher layer signaling can inform the time/frequency information about the first region, such as period, period offset, repetition, gap between the occasions, the number of the occasions. In one example, the first region is a subset of the second region. In some implementation, the slot of S-PRS region is associated with the first region. The S-PRS only can be transmitted in S-PRS region. For example, the slot of S-PRS region includes slots of the first region. The region of S-PRS can be determined according to the first region of SCI informing the information of S-PRS, alternatively, the first region of SCI informing the information of S-PRS can be determined based on region of S-PRS. In some implementation, the higher layer signaling can inform a region, then the S-PRS and the SCI informing the information of S-PRS only can be located in region configured by the higher layer signaling.

In some implementation, the SCI informing PSSCH can inform whether there is an SCI informing the S-PRS. The SCI informing the S-PRS can occupy time/frequency resources of a PSSCH scheduled by the SCI informing PSSCH.

In some embodiments, the SCI informing the information of S-PRS and the SCI informing the information of PSSCH are the same SCI. One SCI can include information of S-PRS and PSSCH. The SCI may include a bit field which is used to inform one value from a set of values {only S-PRS, only PSSCH, both S-PRS and PSSCH}. In one aspect, "Only S-PRS" indicates that only S-PRS is triggered by the SCI, only S-PRS information is included in the SCI, and/or only S-PRS information is reserved in the SCI. For example, the SCI may include information of selected time/frequency resource. All of the selected time/frequency resource may be only for S-PRS. In one aspect, "Only PSSCH" indicates that only PSSCH is triggered and/or only PSSCH information is included in the SCI, and/or only PSSCH information is reserved in the SCI. In one aspect, "Both S-PRS and PSSCH" indicates that the SCI trigger both S-PRS and PSSCH. In one aspect, "Both S-PRS and PSSCH" may also indicate that the SCI includes information of S-PRS and PSSCH. The selection value from the set of value {only S-PRS, only PSSCH, both S-PRS and PSSCH} may also represent the bit field set included in the SCI. The selection value from the set of value also may be considered as the selection among three SCI formats which include a first SCI format of an SCI informing PSSCH, a second SCI format of an SCI informing S-PRS, and a third SCI format of an SCI informing both S-PRS and PSSCH. The number of bits included in the three SCI formats may be the same, but the indication or the information conveyed by the bits may be different (e.g., the mapping between bits and information indicating by the bits may be different).

In some embodiments, when the SCI informs that it includes both S-PRS and PSSCH information, the SCI may include information of PSSCH and information of S-PRS. The two pieces of information may be independent. For example, the SCI may include a first set of bit fields to inform at least one of S-PRS: S-PRS resource index, S-PRS resource set index, S-PRS pool index, the number of S-PRS occasions in one period, the period of S-PRS, the gap between two consecutive occasions, the number of period of the S-PRS resource, period index of current period, the starting time of the transmitted S-PRS, or whether current period is starting period. One S-PRS resources may be transmitted across all the informed periods. The SCI may also include a second set of bit fields to inform at least one of following of PSSCH: N occasions of one PSSCH, or the period of reserved occasions of other PSSCHs. Each period corresponds to one PSSCH. Different periods may correspond to different PDSCHs. In some embodiments, the first set of bit fields indicates the occasion of the S-PRS, and the second set of bit fields indicates an occasion of the PSSCH, a period of the PSSCH, and that a period of the S-PRS and the period of the PSSCH are same. In some embodiments, the first set of bit fields indicates the period of the S-PRS, and the second set of bit fields indicates the occasion of the PSSCH, the period of the PSSCH, and that the occasion of the S-PRS is in occasions of the PSSCH. In some embodiments, the first set of bit fields indicates the occasion of the S-PRS and the period of the S-PRS, and the second set of bit fields indicates the occasion of the PSSCH and the period of the PSSCH. In some embodiments, the first set of bit fields and the second set of bit fields include same bit fields, where the same bit fields include information of S-PRS and information of PSSCH. The information of S-PRS and the information of PSSCH may be independent. The same bits fields may correspond to or may be configured with the two independent information.

In some embodiments, when the SCI informs/reports/indicates that it includes both S-PRS and PSSCH information, then the information of S-PRS and information of PSSCH may be associated with each other. In one aspect, one of the information of S-PRS and the information of PSSCH can be obtained/determined according to the other. For example, some information of S-PRS may be associated with some information of PSSCH. The SCI may only need to inform one of them, and the other can be obtained based on the informed one. For example, the SCI informs that it includes information of both S-PRS and PSSCH.

Figure 10:
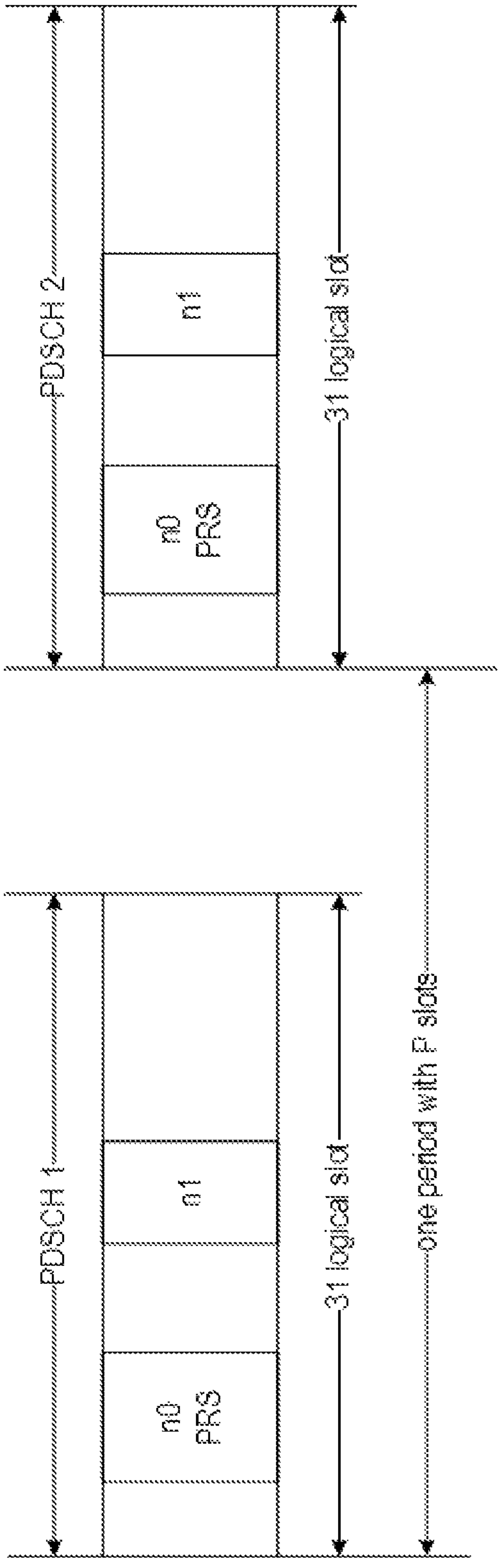
FIG. 10 illustrates examples of occasion and period of PSSCH, in accordance with some embodiments of the present disclosure.

FIG. 10 illustrates examples of occasion and period of PSSCH, in accordance with some embodiments of the present disclosure. The SCI may include N occasions of one PSSCH in one period and period of reserved occasion of other PSSCHs. N occasions in one period may be for one PSSCH. Different periods may correspond to different PDSCH as shown in FIG. 10. In FIG. 10, N is 2, but in different embodiments N can be any number larger than 2. The N occasions in each period includes slot n0 and slot n1. The index of slot may be an index among logical slots which only include a slot available for side-link communication. The period may be also a length among the logical slots. The period may be not an absolute period. In one implementation, the S-PRS may only occur in one occasion of the N occasions of one PSSCH of one period and the period of S-PRS occasions (occasions=occurrences, count and/or time domain positions/locations of PSSCH transmissions) and the period of PSSCH occasions may be the same. The S-PRS may only occur in one slot of the N slots of PSSCH. For example, the S-PRS may only occur in first slot, e.g., slot n0, in each period. The PSSCH may not occupy the RE occupied by the S-PRS in slot n0. In one implementation, the information of S-PRS can be obtained according to a parameter of one occasion of the N occasions in one period. In one implementation, the period of S-PRS and PSSCH may be the same, but the occasions of S-PRS in one period may be different and can be informed/provided respectively/separately. The SCI can indicate slot indexes of N PSSCH occasions and M occasions of an S-PRS. The SCI may include at least one piece of information of the M occasions of the S-PRS: M, or a gap between occasions.

Figure 11A:
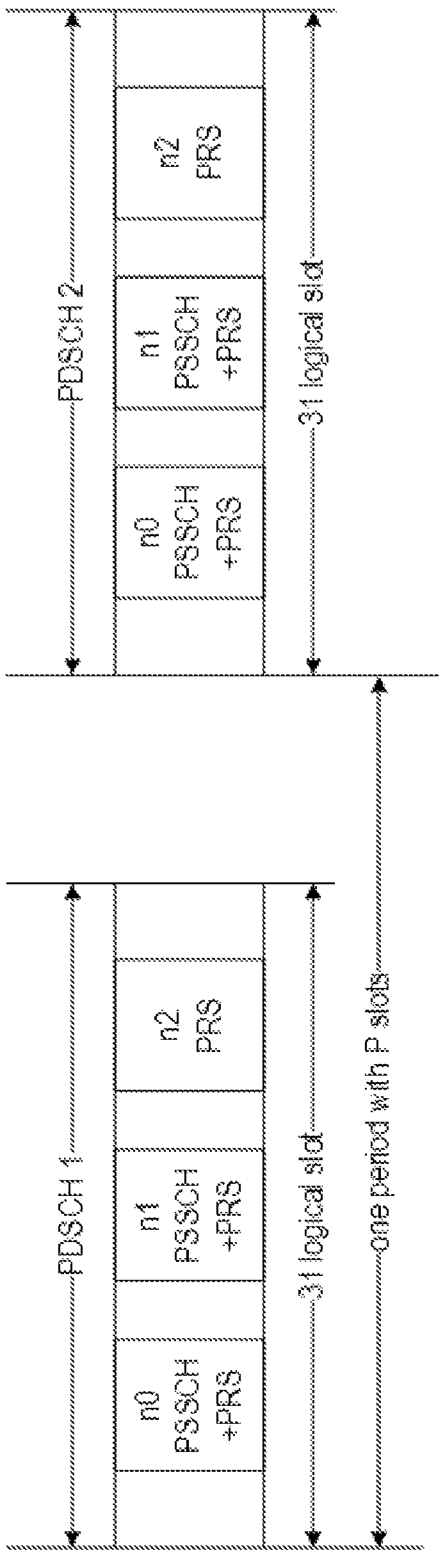
FIG. 11*a* illustrates examples of SCI including information about M occasions of S-PRS and N occasions of PSSCH in one period, where the period of the S-PRS and the PSSCH are the same, in accordance with some embodiments of the present disclosure.

FIG. 11*a* illustrates examples of SCI including information about M occasions of S-PRS and N occasions of PSSCH in one period, where the period of the S-PRS and the PSSCH are the same, in accordance with some embodiments of the present disclosure. N S-PRS occasions of the M S-PRS occasions can overlap with the N PSSCH occasions as shown in FIG. 11*a*, where M is larger than N, e.g., M=3, N=2. In one implementation, the period of PSSCH and S-PRS may be different and are informed/indicated respectively, the S-PRS occasions in one S-PRS period and the PSSCH occasions in one PSSCH period may be the same. In one implementation, the S-PRS occasions in one period and the PSSCH occasions in one period may be same and the period of S-PRS and the period of PSSCH may be same. The S-PRS and the PSSCH may be in the same slot, and the PSSCH may not occupy the RE occupied by the S-PRS. In one implementation, the S-PRS occasions in one period and the PSSCH occasions in one period may be the same and the period of S-PRS and the period of PSSCH may be different. When the S-PRS and the PSSCH are in the same slot, the PSSCH may not occupy the REs occupied by the S-PRS.

Figure 11B:
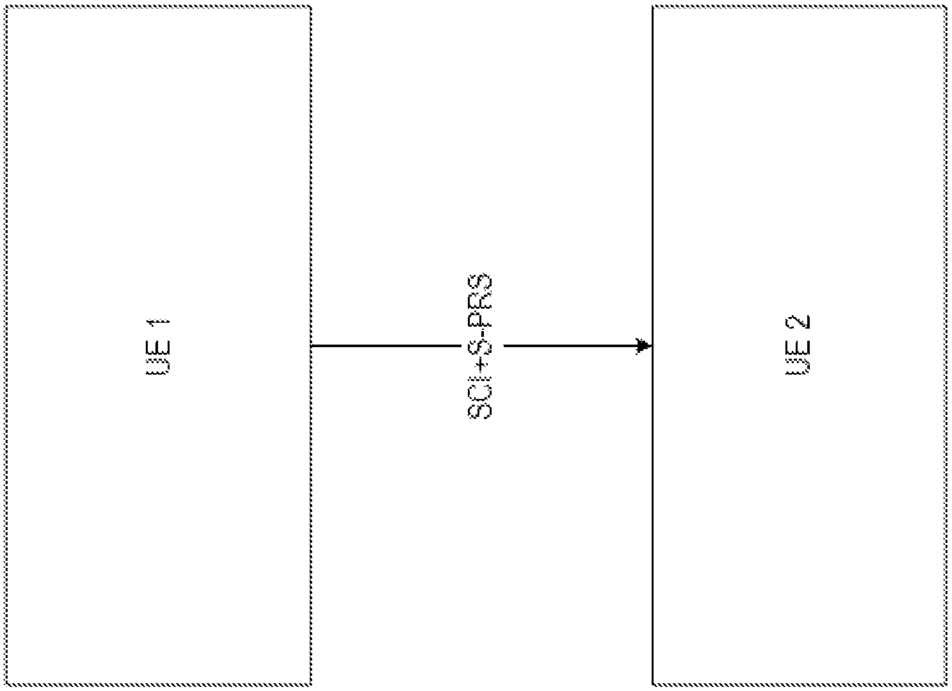
FIG. 11*b* illustrates examples of SCI and S-PRS transmitted by same communication device, in accordance with some embodiments of the present disclosure.

FIG. 11*b* illustrates examples of SCI and S-PRS transmitted by same communication device, in accordance with some embodiments of the present disclosure. In one aspect, the SCI including the information of S-PRS may also represent that S-PRS is transmitted by the UE who transmits the SCI. The UE transmitting the SCI and the UE transmitting S-PRS may be the same UE. As shown in FIG. 11*b*, UE1 may transmit the SCI and S-PRS in a side-link to UE2. The receiver UE2 may receive the SCI, or receive the SCI and S-PRS. In response to the SCI, the receiver UE2 may determine that the UE2 should receive the S-PRS.

Figure 11C:
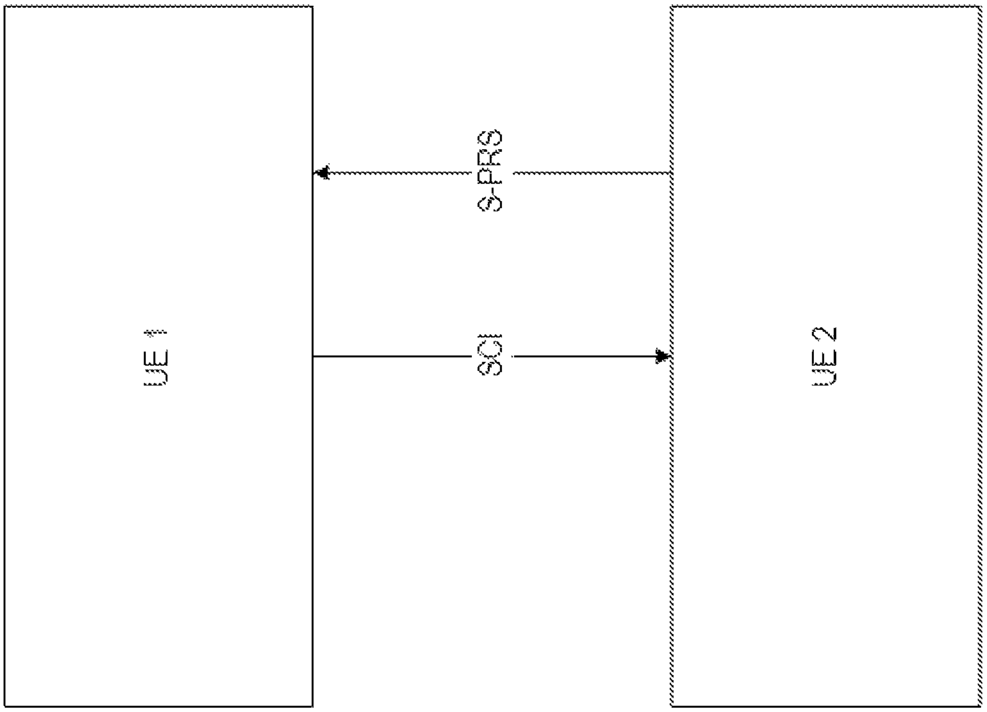
FIG. 11*c* illustrates examples of the SCI indicating second communication device to transmit the S-PRS according to the information of S-PRS associated with the SCI, in accordance with some embodiments of the present disclosure.

FIG. 11*c* illustrates examples of the SCI indicating second communication device to transmit the S-PRS according to the information of S-PRS associated with the SCI, in accordance with some embodiments of the present disclosure. As shown in FIG. 11*c*, UE1 may transmit SCI to UE2 and cause UE2 to transmit S-PRS, in response to the SCI. The UE2 may transmit S-PRS to UE1, or the UE2 may transmit S-PRS to at least one of UE1, or other UE. The information of the S-PRS may include time/frequency/sequence/code domain parameter of the S-PRS. The UE2 may transmit the S-PRS adopting the information of the S-PRS based on the SCI.

In some embodiments, the UE1 can determine the information of S-PRS included in the SCI by itself instead of receiving information from gNB through a Uu link. For example, the UE1 determines the information of S-PRS based on above monitoring and selection rule. In some embodiments, the UE1 determines the information of S-PRS according to a received DCI from a third communication node (such as gNB) through a Uu link.

In some embodiments, the UE1 transmits the SCI and the SCI includes information multiple S-PRS resources transmitted by multiple UEs. For example, the SCI may include information of S-PRS resource 1 transmitted by UE1 and S-PRS resource 1 transmitted by UE4. Different S-PRS resources may be transmitted by different side-link UEs, then different S-PRS resources can be associated with different UE identification. In some embodiments, different S-PRS resource sets/pools may be transmitted by different side-link UEs, different S-PRS resource sets/pools can be associated, configured, or indicated with different UE identifications, or different parameters to be used to generate a bit sequence for S-PRS resources in the S-PRS resource set or pool. In one aspect, a bit sequence of one S-PRS resource can be obtained based on: the parameter associated/configured/indicated with the S-PRS resource set/pool including the one S-PRS resource, and another parameter associated, configured, or indicated with the one S-PRS resource. The former parameter may be shared by S-PRS resources in the S-PRS resource set/pool and the later parameter may be configured with the one S-PRS resource.

Example 2

In one aspect, a corresponding relationship between parameter of SCI and a first type information of S-PRS exists. The parameter of SCI may include parameter of a PSCCH including the SCI. The first type information of S-PRS can be a first type information of an S-PRS resource/set/pool. The SCI may not include a bit field to inform/provide the first type information of S-PRS explicitly, and the receiver can implicitly get the first type information of S-PRS according to the parameter of the SCI. For example, the parameter of the SCI may include at least one of index of slot including the PSCCH, index of OFDM including the PSCCH, index of PRB where the PSCCH locates, or SCI format of the SCI. For example, the S-PRS resource index can be associated with the lowest PRB index occupied by the PSCCH including the SCI. Different lowest PRB indexes can be associated with different S-PRS resources as shown in FIG. 8. The first type information of S-PRS can be applied to one of an S-PRS resource, an S-PRS resource set, an S-PRS resource pool. The first type information of the S-PRS resource/set/pool may include at least one of: S-PRS resource index, set index, pool index, PRB span, time domain information, or comb size. S-PRS may include, refer to, or correspond to one of S-PRS resource, S-PRS resource set, or S-PRS resource pool. In some implementation, one SCI may correspond to multiple values of first type information of S-PRS, and the SCI can further include a bit field explicitly to select one value of first type information. For example, the PSCCH including the SCI may occupy 8 PRBs as shown in FIG. 9. The 8 PRBs may correspond to 8 S-PRS resources. In one aspect, a bit field in the SCI can inform/indicate/specify an S-PRS resource selected from the 8 S-PRS resources corresponding to the SCI.

In some embodiments, the parameter of SCI may be associated with the first type information of the S-PRS, only if the SCI includes a bit field which informs that an S-PRS resource/set/pool is triggered, informed, included, or reserved. If the bit field informs that no S-PRS resource/set/pool is triggered, informed, included, or reserved by the SCI, then the parameter of the SCI may not be associated with the first information of the S-PRS.

In some embodiments, there is a relationship between parameter of SCI and a first type information of S-PRS, and the parameter of SCI may include a parameter of a PSSCH including the SCI.

Example 3

In some embodiments, one piece/portion/field of SCI informs that it includes both S-PRS and PSSCH information. The information of S-PRS and information of PSSCH may be associated with each other. Based on one of the information of S-PRS and information of PSSCH, the other of the information of S-PRS and information of PSSCH can be generated, obtained or inferred. For example, the information of S-PRS and information of PSSCH may be the same or have a corresponding/correspondence relationship. For example, some information of S-PRS may be associated with some information of PSSCH. The SCI may only inform one of them, and the other can be generated, obtained, or inferred, based on the informed one.

For example, the SCI informs that it triggers/includes both S-PRS and PSSCH. The SCI may include N occasions of one PSSCH in one period and a period of reserved occasion of other PSSCHs. N occasions in one period may be for one PSSCH. Different periods may correspond to different PDSCHs as shown in FIG. 10, but one S-PRS resource/set/pool may occur every period of the informed periods. In FIG. 10, the N is 2, and the N occasions in each period includes slot n and slot n1. The index of slot may be index among logical slots which only include slot available for side-link, or available for a pool of side-link. The period may be a length (e.g., time duration/span) among logical slots. The period may be adjustable and may be changed dynamically.

In one implementation, the S-PRS may only occur in one occasion of the N occasions of one PSSCH of one period, where the period of S-PRS occasions and the period of PSSCH occasions may be the same. The S-PRS may only occur in one slot of the N slots of PSSCH. For example, the S-PRS may only occur in first slot, e.g., slot n0, in each period. The PSSCH may not occupy the RE occupied by the S-PRS in slot n.

In one implementation, the information of S-PRS can be obtained according to a parameter of one occasion of the N occasions in one period.

In one implementation, the period of S-PRS and PSSCH may be the same, but the occasions of S-PRS in one period may be different and can be informed and provided, respectively and separately. The SCI can indicate slot indexes of N PSSCH occasions and M occasions of an S-PRS. The SCI may include at least one piece of information of the M occasions of the S-PRS: M, or a gap between occasions. N S-PRS occasions of the M S-PRS occasions can overlap with the N PSSCH occasions as shown in FIG. 11*a* wherein M is larger than N, e.g., M=3, N=2.

In one implementation, the period of PSSCH and S-PRS may be different and are informed/indicated respectively, and the S-PRS occasions in one S-PRS period and the PSSCH occasions in one PSSCH period may be the same.

In one implementation, the S-PRS occasions in one period and the PSSCH occasions in one period may be the same, and the period of S-PRS and the period of PSSCH may be the same. The S-PRS and the PSSCH may be in the same slot, and the PSSCH may not occupy the RE occupied by the S-PRS.

In one implementation, the S-PRS occasions in one period and the PSSCH occasions in one period may be the same, and the period of S-PRS and the period of PSSCH may be different. When the S-PRS and the PSSCH are in the same slot, the PSSCH may not occupy the REs occupied by the S-PRS.

Example 4

Figure 12:
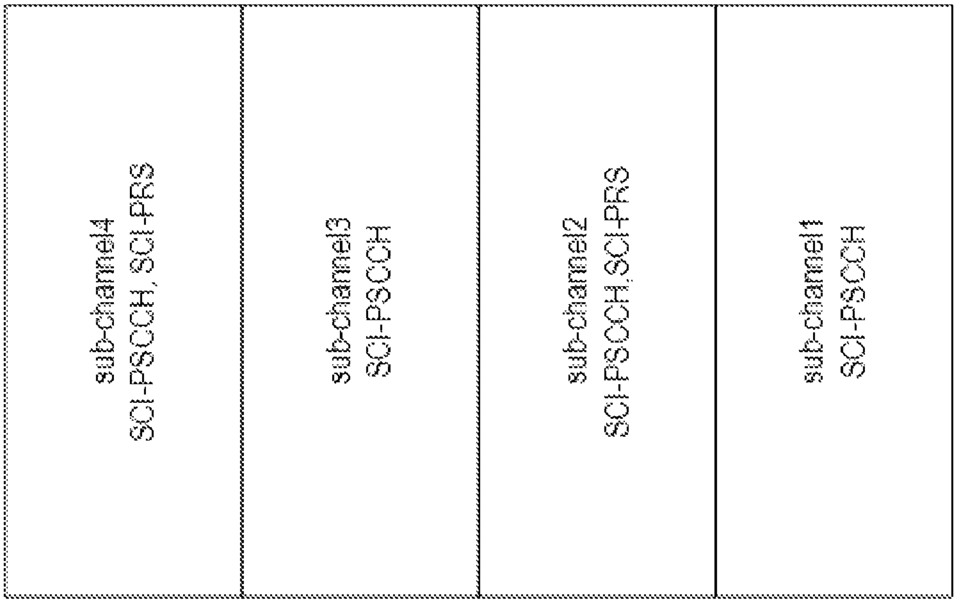
FIG. 12 illustrates examples of SCI-PRS in a subset of sub-channels which can include SCI-PSSCH, where SCI-PRS only can be sub-channels in first region, in accordance with some embodiments of the present disclosure.
Figure 13:
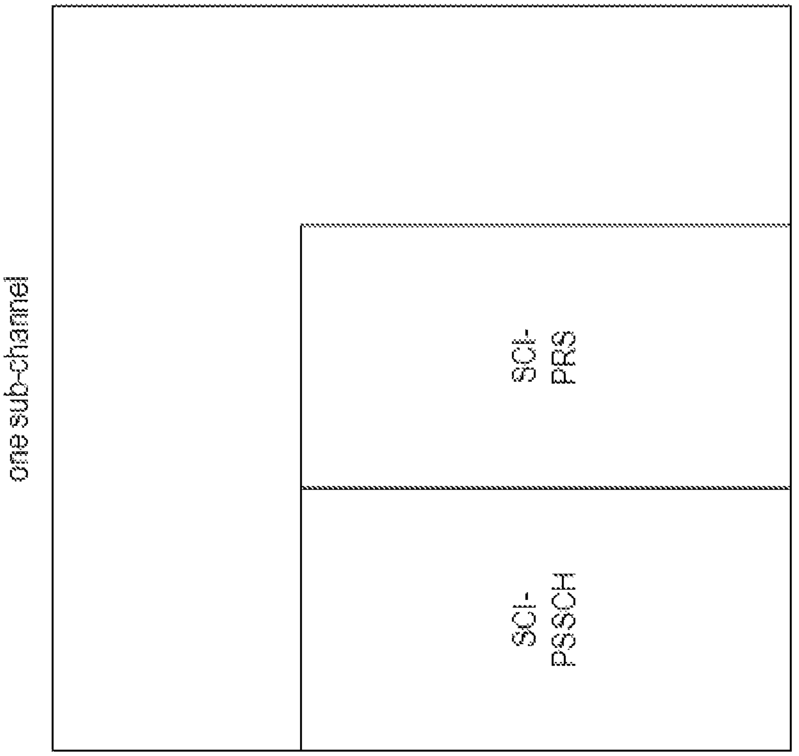
FIG. 13 illustrates examples of SCI-PRS and SCI-PSSCH located in different OFDM symbols in one sub-channel, in accordance with some embodiments of the present disclosure.
Figure 14:
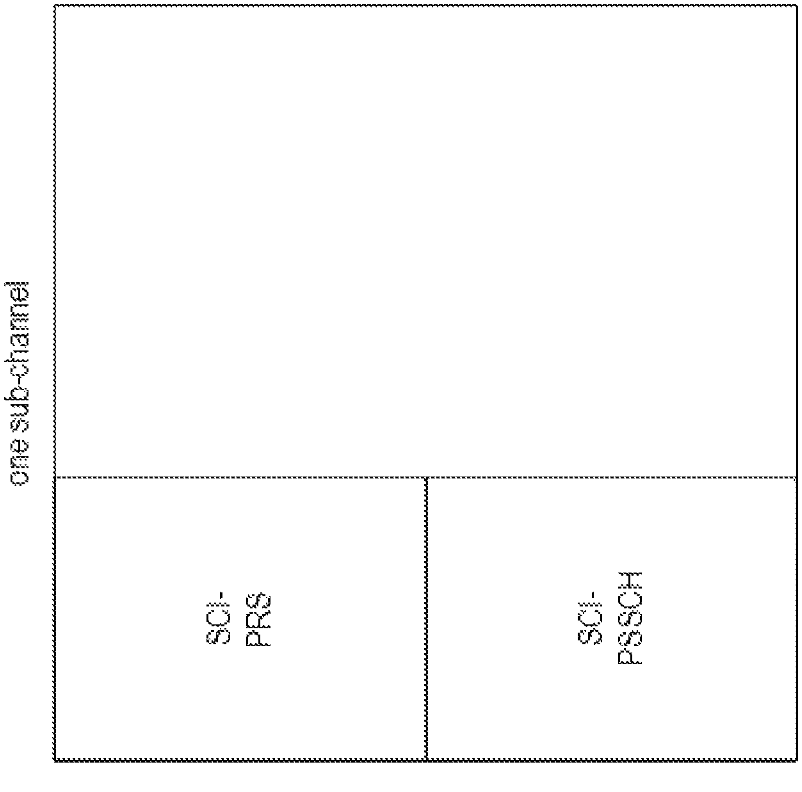
FIG. 14 illustrates examples of SCI-PRS and SCI-PSSCH located in different PRBs in one sub-channel, in accordance with some embodiments of the present disclosure.

FIGS. 12-14 illustrate examples of SCI-PRS and SCI-PSSCH provided through one or more sub-channels for a side-link communication between two UEs, in accordance with some embodiments of the present disclosure. FIG. 12 illustrates examples of SCI-PRS in a subset of sub-channels which can include SCI-PSSCH, where SCI-PRS only can be sub-channels in first region, in accordance with some embodiments of the present disclosure. FIG. 13 illustrates examples of SCI-PRS and SCI-PSSCH located in different OFDM symbols in one sub-channel, in accordance with some embodiments of the present disclosure. FIG. 14 illustrates examples of SCI-PRS and SCI-PSSCH located in different PRBs in one sub-channel, in accordance with some embodiments of the present disclosure.

In some embodiments, the SCI informing S-PRS and the SCI informing PSSCH are different SCIs. For example, the SCI informing S-PRS and the SCI informing PSSCH are in two separate PSCCHs.

In one implementation, parameter of the two PSCCH may be the same, and each sub-channel of PSCCH can include only one of the two PSCCHs. Each sub-channel may only include one location of PSCCH. The two PSCCHs can be in different sub-channels.

In one implementation, some parameters of the two PSCCHs may be the same, and each sub-channel of PSCCH can include any one of the two PSCCHs, or both of the two PSSCHs. Each sub-channel may include two locations of the PSCCHs as shown in FIG. 13 and FIG. 14. In FIG. 13 and FIG. 14, the location of the two PSCCHs may be fixed, assigned, allocated, or predetermined, e.g., the first PSCCH may be fixed, assigned, allocated, or predetermined for SCI-PSSCH and the second PSCCH may be fixed, assigned, allocated, or predetermined for SCI-PSSCH. In one implementation, the SCI-PSSCH can be in first PSCCH, and the SCI-PSSCH can be in first PSCCH and second PSCCH. The SCI-PSSCH may indicate whether there is SCI-PRS in the sub-channel. The SCI-S-PRS can also indicate whether there is SCI-PSSCH in the sub-channel. The SCI-S-PRS and the SCI-PSSCH may be transmitted by the same UE when they are in one sub-channel. Each sub-channel may include two PSCCHs. Some parameter of the two PSCCHs can be configured separately/independently/respectively. The parameter may include at least one of OFDM location of the PSCCH, the number of PRBs occupied by the PSCCH, DMRS information, the number of reserved bits, sub-channel size, the number X of sub-channels, sub-channel index where the SCI can locate, OFDM offset between the two PSCCHs, or frequency offset (such as PRB offset) between the two PSCCHs. The UE may monitor the SCI-PSSCH or SCI-PRS every X sub-channels. Alternatively, the location of the two PSCCHs may be the same, but the two PSSCHs may correspond to respective DMRS port. For example, if the parameter includes DMRS port number, the two PSCCHs can overlap and occupy different orthogonal DMRS ports.

If the two SCIs are in one sub-channel, the time/frequency parameter for the two SCIs may not overlap. For example, the two SCIs may be in or associated with different symbols. The number of PRBs for the SCIs can be different or same as shown in FIG. 13. The symbol offset between the SCIs can be a fix value or a configured value. Alternatively, the SCIs may be in or associated with the same symbol but with different PRBs as shown in FIG. 14. The PRB offset between them can be a fix value or a configured value. The first symbol of each of the two PSCCHs may be a repetition symbol of the following second symbol. The first symbol of each of the two SCIs may be an adapt gain control (AGC) symbol to configure its receiver. In FIG. 13, the SCI-S-PRS and the SCI-PSSCH may be transmitted by one UE. Optionally, the SCI-PSCCH may inform whether there is SCI-S-PRS. The SCI-S-PRS can also inform whether there is SCI-PSSCH. If the UE selects one sub-channel, the UE may transmit any one of SCI-S-PRS and SCI-PSSCH. The UE can also transmit both of SCI-S-PRS and SCI-PSSCH. SCI-S-PRS may represent or correspond to SCI informing S-PRS. SCI-PSSCH may represent or correspond to SCI informing PSSCH. In some embodiments, SCI-S-PRS and SCI-PSSCH in one sub-channel are transmitted by a single UE, and not transmitted by different UEs.

In one implementation, a first type parameter of the two PSCCHs may be the same, and a second type parameter of the two PSCCHs may be configured separately, independently, or respectively. The first type of parameter may include sub-channel parameter. The second type of parameters may include resource information of location of PSCCH.

In one implementation, a first type parameter of the two PSCCHs may be the same, and a second type parameter of the two PSCCHs may be configured separately, independently, or respectively. The first type of parameter may include resource information of location of PSCCH. The second type of parameter may include a sub-channel parameter. The sub-channel parameter may include at least one of such as sub-channel size, number of sub-channels, the start PRB of first sub-channel. Resource information of location of PSCCH may include at least one of: OFDM location of the PSCCH, the number of PRBs occupied by the PSCCH, DMRS information, the number of reserved bits, sub-channel size, the number X of sub-channels, sub-channel index where the SCI can locate, OFDM offset between the two PSCCHs, or frequency offset (such as PRB offset) between the two PSCCHs. DMRS information may include at least one of parameter to generate bit sequence of a DMRS of a PSSCCH, or DMRS port number.

In one implementation, the SCI-S-PRS can be only located in the first region and the SCI-PSSCH can be only located in the second region. The first region may be a subset of the second region. For example, the SCI informing PSSCH may be monitored in each sub-channel. When the UE attempts to transmit S-PRS, the UE may monitor SCI-S-PRS only in the first region to determine the S-PRS resources selected by other UE. Then, the UE may remove, exclude, or delete the S-PRS resources selected by other UE from candidate S-PRS resources and select S-PRS resources from the remaining candidate S-PRS resources. The UE may transmit an S-PRS signal, utilizing the selected S-PRS resources.

In one implementation, the SCI-S-PRS can be only located in the first region and the SCI-PSSCH can be only located in the second region. The first region and the second region may not overlap. For example, the SCI-PSSCH and SCI-S-PRS can be in different sub-channels, and SCI-PSSCH and SCI-S-PRS may not be in same sub-channel. For example, SCI-PSSCH can be in sub-channel {3n, 3n+1, n=0, 1, 2 . . . }, and SCI-S-PRS can be in sub-channel {3n+2, n=0, 1, 2, . . . }. Alternatively, the SCI-PSSCH and SCI-S-PRS can be in different slots. The sub-channel may be indexed in ascending order across sub-channels in different frequencies in a same slot. Alternatively, the sub-channel may be first indexed in ascending order across sub-channels in different frequencies in a same slot, and then is indexed in ascending order across slots. In some implementation, the two PSCCHs can occupy the same frequency.

Example 5

In some embodiments, the SCI-S-PRS can be only located in the first region. If the UE attempts to transmit S-PRS, the UE may monitor SCI-S-PRS only in the first region in a time window to determine the S-PRS resources selected by other UE. Then, the UE may remove, exclude, or delete the S-PRS resources selected by other UE from candidate S-PRS resources and select S-PRS resources from the remaining candidate S-PRS resources. The UE may transmit an S-PRS signal in the selected S-PRS resources. The higher layer signaling can inform parameter of the first region. For example, the higher layer signaling can inform sub-channel parameter of the first region, and/or slot parameter of the first region, and/or side-link resource pool of the first region, and/or OFDM of the first region, and/or PRB of the first region.

In some implementation, the SCI-PSSCH can be located in the second region. The first region may be a subset of the second region. For example, the SCI informing PSSCH may be monitored in each sub-channel.

In one implementation, the first region and the second region may not overlap. For example the SCI-PSSCH and SCI-S-PRS can be in different sub-channels. For example, SCI-PSSCH can be in sub-channel {3n, 3n+1, n=0, 1, 2 . . . }, and SCI-S-PRS can be in sub-channel {3n+2, n=0, 1, 2, . . . }. Alternatively, the SCI-PSSCH and SCI-S-PRS can be in different slots. In one implementation, the SCI-PSSCH and SCI-S-PRS can be in different RE set of one sub-channel.

In one implementation, the SCI-PSSCH and SCI-S-PRS can be two different SCI and in different PSSCHs as described in Example 4. In another implementation, the SCI-PSSCH and SCI-S-PRS can be one SCI and in same PSSCH. The SCI may inform one state from states set {only S-PRS, only PSSCH, both S-PRS and PSSCH}. The SCI may inform only S-PRS or both S-PRS and PSSCH only can be located in the first region.

In some embodiments, the first region includes a first set of sub-channels and the second region includes a second set of sub-channels. In some embodiments, the first region includes a first set of slots and the second region includes a second set of slots. In some embodiments, the first region includes a first set of REs in a sub-channel and the second region includes a second set of REs in the sub-channel. In some embodiments, the first region includes a first PSCCH in a sub-channel and the second region includes a second PSCCH in the sub-channel. In some embodiments, the first region includes a first side-link resource pool and the second region includes a second side-link resource pool.

Example 6

A second type information of S-PRS may be configured for each S-PRS resource respectively. A third type information of S-PRS may be configured for each S-PRS resource set/pool. The third type information may be applied to all S-PRS resources in the S-PRS resource set/pool. A S-PRS resource pool may include one or more S-PRS resource sets. A S-PRS resource set may include one or more S-PRS resources. The second type information of S-PRS may include at least one of: a parameter used to generate bit sequence for an S-PRS resource, comb offset. The signal of the S-PRS is generated according to the bit sequence. Comb offset may represent RE offset of the S-PRS among comb size of REs. The S-PRS may occupy one RE every comb size of REs. The third type information of S-PRS may include at least one of: comb size, PRB span, slot index, index of symbol in a slot, period, the number of occasions in one period, gap between consecutive occasions. The second type information can be configured by higher layer signaling or SCI. The third type information can be configured by higher layer signaling or SCI.

Example 7

Figure 15:
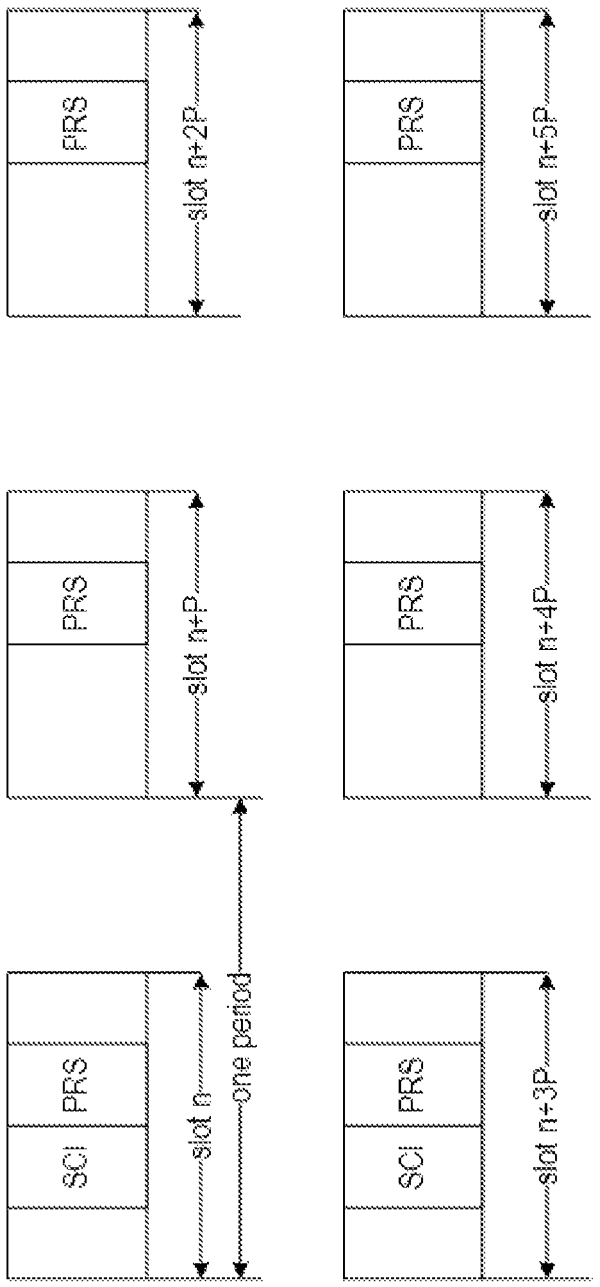
FIG. 15 illustrates examples of periods of S-PRS and SCI-PRS triggering the S-PRS being different, where some occasion/period of S-PRS transmission is without SCI-PRS, in accordance with some embodiments of the present disclosure.
Figure 16A:
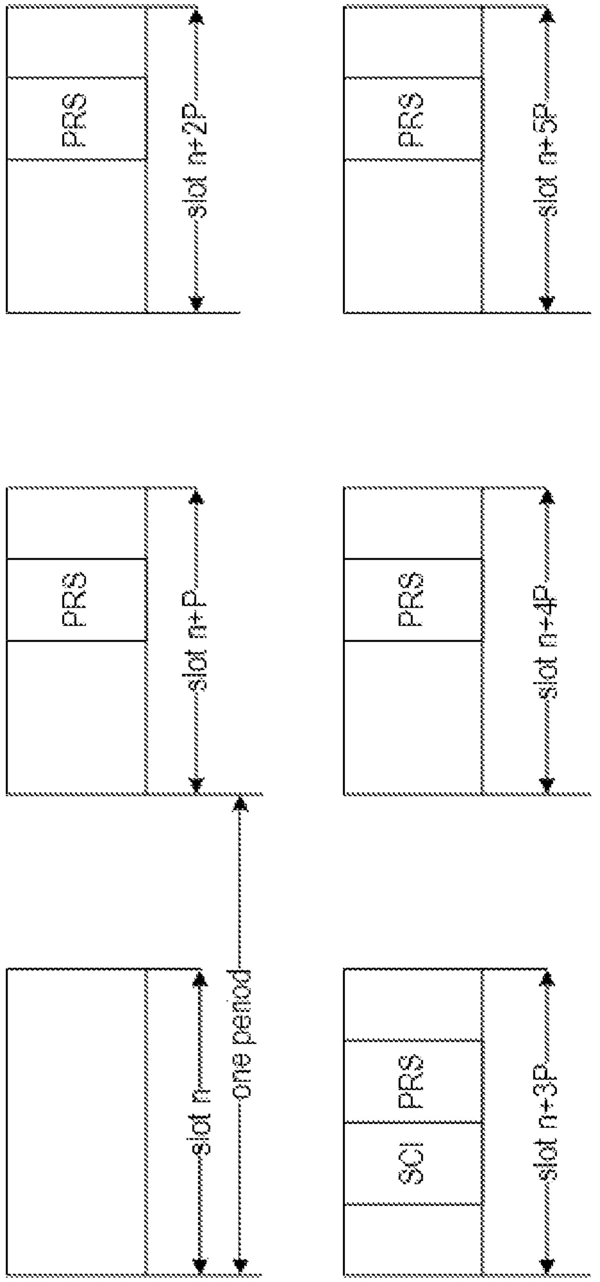
FIG. 16*a* illustrates examples of the S-PRS starts later than the first slot of previous Q periods before the slot of the SCI-PRS, in accordance with some embodiments of the present disclosure.
Figure 16B:
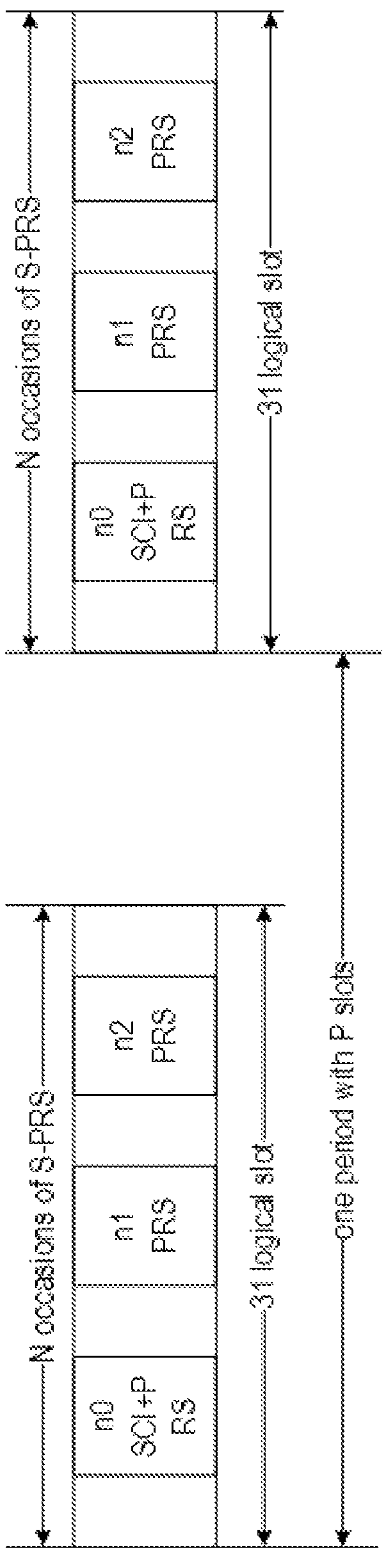
FIG. 16*b* illustrates examples of SCI-PRS only in a slot of one occasion of M occasions of the S-PRS in one period, in accordance with some embodiments of the present disclosure.

FIG. 15 and FIGS. 16*a*-16*b* illustrate examples of slots for a side-link communication between two UEs, in accordance with some embodiments of the present disclosure. The S-PRS may be transmitted in some S-PRS occasions without SCI. FIG. 15 illustrates examples of periods of S-PRS and SCI-PRS triggering the S-PRS being different, where some occasion/period of S-PRS transmission is without SCI-PRS, in accordance with some embodiments of the present disclosure. FIG. 16*a* illustrates examples of the S-PRS starts later than the first slot of previous Q periods before the slot of the SCI-PRS, in accordance with some embodiments of the present disclosure. FIG. 16*b* illustrates examples of SCI-PRS only in a slot of one occasion of M occasions of the S-PRS in one period, in accordance with some embodiments of the present disclosure.

The (transmission) periodicity/occasions of SCI-S-PRS and the periodicity/occasions of S-PRS may be different. The period of S-PRS may be P. The period of SCI-S-PRS can be P*Q, where Q is an integer larger than 1. The SCI may occur once every Q periods of S-PRS as shown in FIG. 15, where Q is 3 in FIG. 15.

In some embodiments, the UE may transmit S-PRS in slot {n+P, n+2P} without SCI-S-PRS. The UE may transmit SCI-S-PRS and S-PRS in slot n. The SCI may include information of S-PRS, where the information of S-PRS includes at least one of the period of S-PRS, the number of periods, the index of the current Q periods among multiple Q periods, the period index of the current period, the index of slot where the S-PRS starts, offset between slot where the S-PRS starts and current slot of S-PRS, whether the S-PRS starts before current Q period, whether the S-PRS starts before current period, the index of a first slot of the S-PRS in previous Q periods, whether the S-PRS starts later than a first slot of previous Q periods, etc. For example, the SCI-S-PRS in slot n+3P may include period of S-PRS P and index of slot n. If the S-PRS starts later than the first slot of previous Q periods as shown in FIG. 16*a*. The SCI may include P and slot index of n+P. Then if the UE monitors any SCI-S-PRS, the UE may determine whether the UE starts from previous Q periods.

When the SCI includes at least one of the index of a slot where the S-PRS starts, the number of periods, the period index of the current Q periods, or the period index of the current period, the receiver UE which successfully detects any SCI-S-PRS can determine all periods of the S-PRS. The number of periods can be the number of all periods of the S-PRS, or be the number of periods of the S-PRS which is later than the current period.

In FIG. 15 and FIG. 16*a*, the SCI may be an SCI-S-PRS which includes information of S-PRS. The SCI-S-PRS may refer to an SCI which includes information about the S-PRS.

In another implementation, the period of SCI-S-PRS and the period of S-PRS are same, but the number of occasions in one period for SCI-S-PRS and S-PRS are different. As shown in FIG. 16*b*, there are 3 occasions of S-PRS in one period and 1 occasions of SCI-S-PRS in one period. The SCI-S-PRS may be only transmitted in a slot of the first occasion of 3 occasions of S-PRS in one S-PRS period. The remaining occasion the S-PRS may be transmitted without SCI-S-PRS.

Example 8

Figure 17:
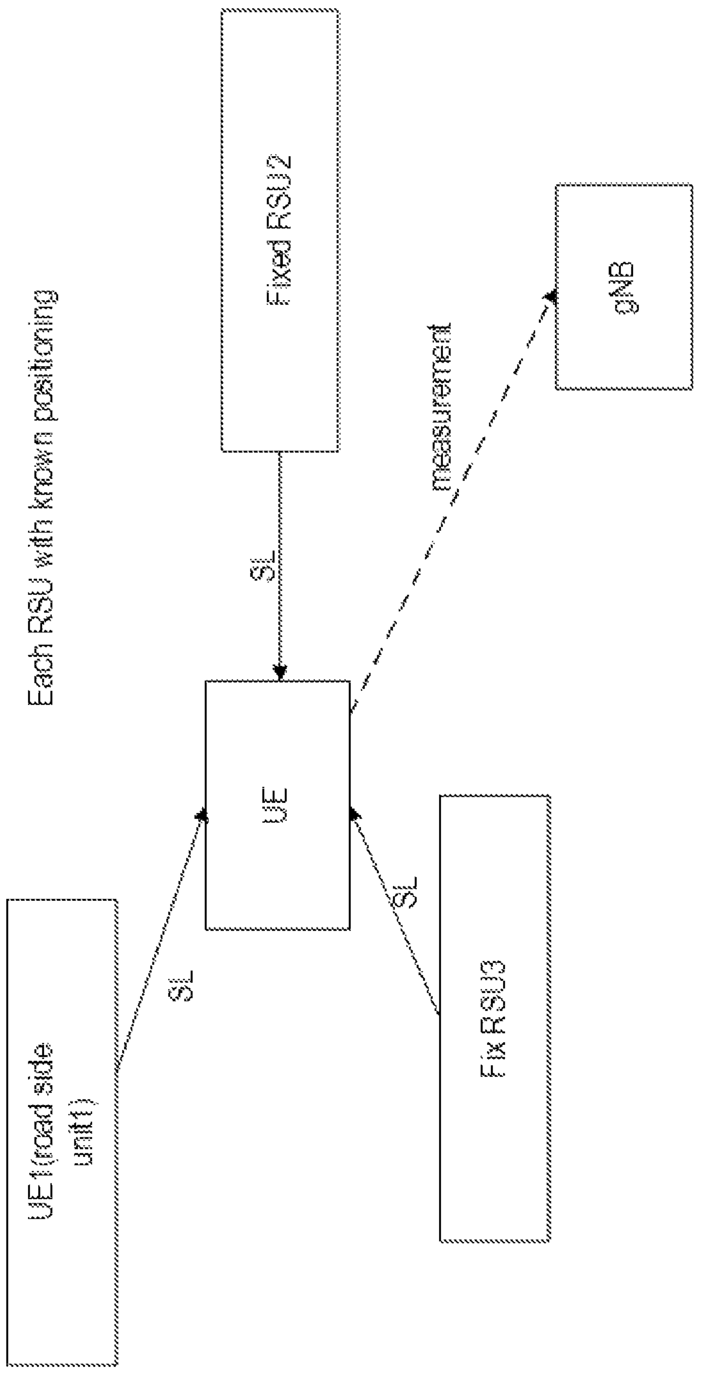
FIG. 17 illustrates example of the communication device reporting S-PRS measurement to a base station using Uu link, in accordance with some embodiments of the present disclosure.

FIG. 17 illustrates example of the communication device reporting S-PRS measurement to a base station using Uu link, in accordance with some embodiments of the present disclosure. In some embodiments, the UE receives S-PRS through a side-link and provides feedback of the measurement of S-PRS to gNB using Uu-link as shown in FIG. 17. In one example, the UE1 is a road side unit (RSU). The Uu-link may be a link between UE and base station, such as gNB.

In some implementation, the SCI triggering S-PRS includes one of unicast, group cast, or broadcast. The UE may receive the S-PRS, and may not report S-PRS measurement result through a side-link. In some implementation, the SCI informs the UE that the UE may not report S-PRS measurement through the side-link. In some implementation, when the UE is in the coverage of the gNB, no side-link feedback channel is associated with S-PRS, because the measurement of S-PRS is provided to gNB as a feedback through Uu link instead of through a side-link. In some implementation, the SCI includes at least one of: whether to report S-PRS measurement result through side-link, or whether to report S-PRS measurement result to gNB/LMF through a Uu link. In some implementation, if a DCI indicates UE to report S-PRS measurement result through a Uu link, then the SCI received by the UE may indicate that the UE may not need to report S-PRS measurement result through the side link.

Example 9

Figure 18:
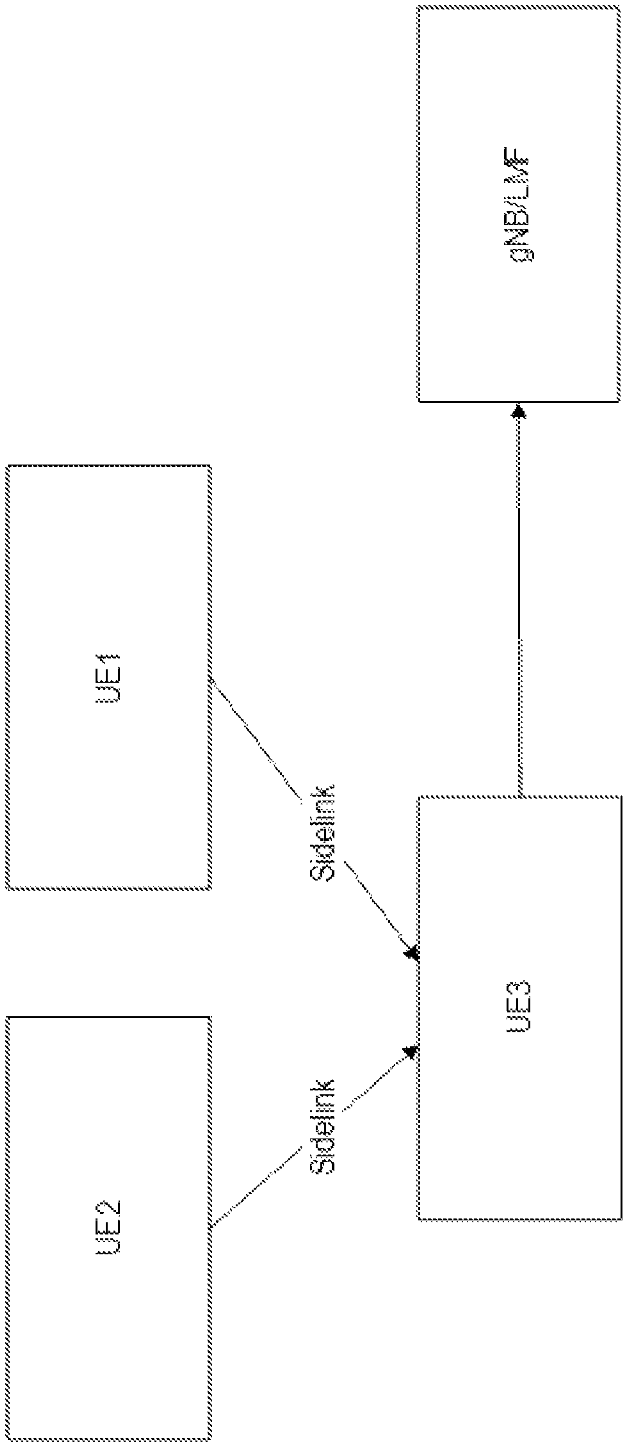
FIG. 18 illustrates example of the communication device transforming S-PRS measurement of other communication device to a base station using Uu link, where the communication device receives the S-PRS measurement of other communication device via side-link transmitted by the other communication device, in accordance with some embodiments of the present disclosure.

FIG. 18 illustrates example of the communication device transforming S-PRS measurement of other communication device to a base station using Uu link, where the communication device receives the S-PRS measurement of other communication device via side-link transmitted by the other communication device, in accordance with some embodiments of the present disclosure. In some embodiments, the UE reports S-PRS measurement result of another UE to gNB/LMF (Location management function)/target UE. The S-PRS measurement result of the other UE may be received by the UE from the other UE using side-link. The UE may report S-PRS measurement of the other UE and UE identification to gNB or LMF.

As shown in FIG. 18, UE3 may receive S-PRS measurement result from UE2 and UE1 through side-links. UE3 may report the received S-PRS measurement result from UE2 and UE 1 to gNB/LMF/target UE. In some implementation, the UE3 not only reports S-PRS measurement result of other UE received from other UE through side-link(s), but also reports S-PRS measurement result of itself to gNB, LMF, or a target UE. In some implementation, the UE3 may compute or determine the location of other UE and report the location of other UE(s) to gNB, LMF, or target UE. The location of other UE may be based on S-PRS measurement result reported by other UE through side-link. For example, UE3 may report locations of UE1 and UE2 to gNB or LMF through a Uu link. Each location may be associated with a UE identification.

Example 10

In some embodiments, a Side-link UE1 informs a side-link UE2 about a parameter of a side-link feedback channel. The UE1 may receive S-PRS measurement result reported by UE2 in the side-link feedback channel. The side-link feedback channel can be PSFCH or a channel different from PSFCH. If the feedback channel is PSFCH, UE2 can report HARQ-ACK and S-PRS measurement result in one PSFCH. If the feedback channel is a channel different from PSFCH, UE2 can report HARQ-ACK in PSFCH and report S-PRS measurement result in the feedback channel. The feedback channel different from PSFCH can be a feedback data channel.

In some implementation, UE1 informs the parameter of side-link feedback channel using a bit field in SCI. The parameter of side-link feedback channel includes at least one of: time parameter, frequency parameter, or code domain parameter.

Example 11

In some embodiments, a Side-link UE1 obtains or determines a parameter of side-link feedback channel according to parameter of S-PRS. The UE1 may receive S-PRS measurement result reported by UE2 in the side-link feedback channel. The side-link feedback channel can be PSFCH or a channel different from PSFCH. The S-PRS measurement result may be based on the S-PRS.

For example, each S-PRS resource is associated with a side-link feedback channel. UE1 may transmit multiple S-PRS resources to UE2 and inform UE2 to report S-PRS measurement based on the multiple S-PRS resources. Each of the S-PRS resources of multiple S-PRS resources may be associated with a side-link feedback channel. The UE2 may report S-PRS measurement result in one of multiple side-link feedback channels each of which is associated with one S-PRS resource of the multiple S-PRS resources. The multiple side-link feedback channels may correspond to the multiple S-PRS resources. UE2 may report the S-PRS measurement result based on measuring the multiple S-PRS resources.

UE2 may determine or obtain the one side-link feedback channel from the multiple side-link feedback channels according at least one of: parameter of SCI triggering SCI, UE identification of UE2 who reports the S-PRS measurement result, UE identification of UE1 who receives the report, information indicated by SCI, parameter of S-PRS, parameter of S-PRS resources selected by the UE2, or UE identification of UE1 who transmits the SCI including information of the S-PRS.

Example 12

In some embodiments, a side-link UE1/UE2 obtains a parameter of side-link feedback channel according to at least one of a parameter of S-PRS, a parameter of SCI triggering SCI, UE identification of UE2 who reports the S-PRS measurement result, UE identification of UE1 who receives the report, UE identification of UE1 who transmits the SCI including information of the S-PRS, information indicated by SCI, or parameter of S-PRS resources selected by the UE2. The UE1 may receive S-PRS measurement result reported by UE2 in the side-link feedback channel. The side-link feedback channel can be PSFCH or a channel different from PSFCH. The S-PRS measurement result may be based on the S-PRS. The S-PRS may refer to one of an S-PRS resource, an S-PRS resource set, or an S-PRS resource pool.

Example 13

The SCI includes information about S-PRS transmission in a first time unit and reserved resource for S-PRS in a second time unit. The first time unit and the second time unit can be one period of S-PRS, or a slot, or a set of OFDM symbols in one slot. Optionally, the first time unit and the second time unit share same pattern in one period. For example, the first time unit corresponds to the M occasions of the first period and the second time unit corresponds to M occasions in each of following one or more periods.

Example 14

In some embodiments, there are more than one S-PRS resource groups, where each S-PRS resource group is associated with an S-PRS parameter, respectively. The UE may determine or obtain the S-PRS parameter according to the parameter associated with an S-PRS resource group. The parameter associated with an S-PRS resource group can be configured using signaling or predefined. Different S-PRS resource groups may correspond to different time/frequency resource. The parameter associated with an S-PRS resource group may include at least one of: period of S-PRS, repetition number in one period, repetition gap between two repetition, number of period, or a parameter used to generate bit sequence for an S-PRS resource. One S-PRS resource group may include one or more S-PRS resources.

For example, S-PRS resource group 1 corresponds to parameter 1, and S-PRS resource group 2 corresponds to parameter 2. If a side-link UE1 attempts to transmit an S-PRS resource with parameter 1, then the UE may select an S-PRS resource from an S-PRS resource group 1 and transmit the S-PRS resource. If a side-link UE2 receives an S-PRS resource in an S-PRS resource group 1, the UE2 can determine that that the S-PRS resource is for the S-PRS resource group 1 corresponding to the parameter 1.

In some implementation, if a side-link UE attempts to select an S-PRS resource, the UE may monitor each S-PRS resource group. If the UE monitors any S-PRS resource in an S-PRS resource group, then the UE may not select S-PRS resource in the S-PRS resource group. In some embodiments, the S-PRS is transmitted without an SCI.

Figure 19:
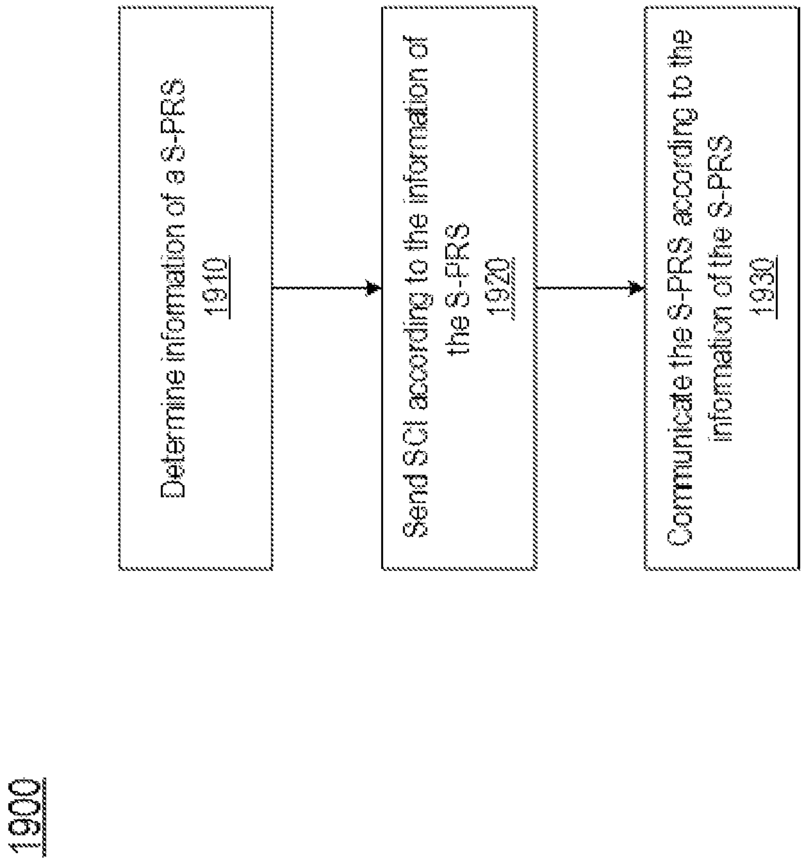
FIG. 19 illustrates a flow diagram of an example method for communicating through a side-link, in accordance with an embodiment of the present disclosure.

FIG. 19 illustrates a flow diagram of an example method 1900 for communicating through a side-link, in accordance with an embodiment of the present disclosure. The method 1900 may be implemented using any of the components and devices detailed herein in conjunction with FIGS. 1-18. In brief overview, a UE may determine information of an S-PRS (1910). The UE may generate, transmit or send SCI according to the information of the S-PRS (1920). The UE may communicate the S-PRS according to the information of the S-PRS (1930).

In one approach, a UE may determine information of an S-PRS (1910). The information of the S-PRS may include at least one of the period of S-PRS, the number of periods, the index of the current Q periods among multiple Q periods, the period index of the current period, the index of slot where the S-PRS starts, offset between slot where the S-PRS starts and current slot of S-PRS, whether the S-PRS starts before current Q period, whether the S-PRS starts before current period, the index of a first slot of the S-PRS in previous Q periods, whether the S-PRS starts later than a first slot of previous Q periods, etc. In one approach, the UE determines a candidate S-PRS resource set. The UE may monitor for SCI transmitted by a third communication device in a first region in a time window. In some embodiments, the SCI is predetermined to be only located in the first region. Based on monitored SCI that is transmitted by a third communication device, the UE may determine an S-PRS resource selected by the third communication device. The UE may remove, exclude, or delete S-PRS resources from the candidate S-RS resource set, based on the determined S-PRS resource. The UE may select an S-PRS resource from remaining S-PRS resources, and determine information of the S-PRS according to the selected S-PRS resource. The UE may receive higher layer signaling that includes a parameter indicating the first region.

In one approach, the UE may generate, transmit or send the SCI according to the information of the S-PRS (1920).

In one aspect, the SCI includes an indication of an S-PRS resource, or an indication of an S-PRS resource and a time parameter of the S-PRS resource. The time parameter may include at least one of: a period, a number of periods, a period index of a current period among multiple periods, a starting time of the S-PRS, an indication of whether the current period is a starting period, an offset between a slot where the S-PRS starts and a current slot of the S-PRS, an indication of whether the S-PRS starts before a current set of Q periods, an indication of whether the S-PRS starts before the current period, an index of a first slot of the S-PRS in a previous set of Q periods, or an indication of whether the S-PRS starts later than a first slot of the previous set of Q periods. The Q may be an integer value equal to or larger than 1.

In one approach, the UE may communicate the S-PRS according to the information of the S-PRS (1930). For the example, the UE may configure or set its transmitter to transmit the SP-PRS, according to the information of the S-PRS, or the UE may configure or set its receiver to receive the S-PRS transmitted by other UE according to the information of the S-PRS.

In some embodiments, the UE may refine the positioning of the other UE based on the S-PRS. For example, the UE may determine a relative positioning with respect to the other UE based on the S-PRS.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

determining, by a first wireless communication device, a candidate side-link positioning reference signal (S-PRS) resource set;

monitoring, by the first wireless communication device, first side-link control information (SCI) transmitted by a third communication device in a first region in a time window, wherein the first SCI is only located in a first region;

determining, by the first wireless communication device, an S-PRS resource selected by the third communication device, according to the first SCI transmitted by the third communication device;

deleting, by the first wireless communication device, at least one S-PRS resource from the candidate S-PRS resource set based on the S-PRS resource selected by the third communication device;

selecting, by the first wireless communication device, an S-PRS resource from at least one remaining S-PRS resource in the candidate S-PRS resource set;

determining, by the first wireless communication device, information of an S-PRS according to the S-PRS resource selected from the at least one remaining S-PRS resource; and sending, by the first wireless communication device to a second wireless communication device, second SCI according to the information of the S-PRS, wherein the second SCI includes an index of the S-PRS resource, wherein the S-PRS starts from a same slot as a slot of the second SCI.

2. The method of claim 1, further comprising:

communicating, by the first wireless communication device with the second wireless communication device, the S-PRS according to the information of the S-PRS.

3. The method of claim 1, wherein the second SCI further includes a time parameter of the S-PRS resource.

4. The method of claim 1, wherein the S-PRS resource is configured by higher layer signaling with: a frequency span of the S-PRS resource, time domain information of the S-PRS resource, a comb size, and a comb offset.

5. The method of claim 1, wherein the second SCI comprises one of: a first stage SCI, an SCI in a physical side-link control channel (PSCCH), unicast SCI, group cast SCI or broad cast SCI.

6. The method of claim 1, wherein a first type of information of the S-PRS is associated with a parameter of the second SCI, and the parameter of the second SCI comprises a parameter of a channel that includes the second SCI.

7. The method of claim 6, wherein the parameter of the channel comprises:

a physical resource block (PRB) index of the channel, and wherein the channel includes a physical side-link control channel (PSCCH), wherein the index of the S-PRS resource is associated with a lowest PRB index occupied by the PSCCH including the second SCI.

8. The method of claim 6, wherein the parameter of the channel comprises:

a slot index of the channel, an orthogonal frequency division multiplexing (OFDM) symbol index of the channel, a physical resource block (PRB) index of the channel, and wherein the channel includes a physical side-link shared channel (PSSCH).

9. The method of claim 1, wherein the second SCI includes a bit field that is used to select one of: only the S-PRS, only a physical side-link control channel (PSSCH), or both the S-PRS and the PSSCH.

10. The method of claim 1, wherein the second SCI includes: a first set of bit fields corresponding to the S-PRS, and a second set of bit fields corresponding to a physical side-link control channel (PSSCH).

11. The method of claim 10, wherein:

the first set of bit fields indicates a period of the S-PRS, and the second set of bit fields indicates an occasion of the PSSCH, the period of the PSSCH, and that the occasion of the S-PRS is in occasions of the PSSCH.

12. The method of claim 1, wherein the second SCI provides the information of the S-PRS, and is independent from another SCI that provides information of a physical side-link shared channel (PSSCH).

13. The method of claim 12, wherein:

the another SCI is located only in a second region;

the first region includes a first set of sub-channels and the second region includes a second set of sub-channels; or the first region includes a first side-link resource pool and the second region includes a second side-link resource pool.

14. The method of claim 12, comprising at least one of;

receiving, by the first wireless communication device, a first signaling which includes a first parameter about the second SCI and a second signaling which includes a second parameter of the another SCI, wherein the first signaling and the second signaling correspond to two side-link resource pools.

15. The method of claim 14, wherein the first parameter or the second parameter includes at least one of:

an orthogonal frequency division multiplexing (OFDM) location of a PSCCH of the SCI, number of physical resource blocks (PRBs) occupied by the PSCCH, a PRB location of the PSCCH, demodulation reference signal (DMRS) information of the PSCCH, number of reserved bits of the SCI, a parameter of a sub-channel corresponding to the PSCCH, or a parameter of a slot where the second SCI can be located.

16. The method of claim 1, comprising:

determining, by the first wireless communication device, the information of the S-PRS according to a received downlink control information (DCI).

17. A first wireless communication device, comprising:

at least one processor configured to:

determine, by a first wireless communication device, a candidate side-link positioning reference signal (S-PRS) resource set;

monitor, by the first wireless communication device, first side-link control information (SCI) transmitted by a third communication device in a first region in a time window, wherein the first SCI is only located in a first region;

determine, by the first wireless communication device, an S-PRS resource selected by the third communication device, according to the first SCI transmitted by the third communication device;

delete, by the first wireless communication device, at least one S-PRS resource from the candidate S-PRS resource set based on the S-PRS resource selected by the third communication device;

select, by the first wireless communication device, an S-PRS resource from at least one remaining S-PRS resource in the candidate S-PRS resource set;

determine, by the first wireless communication device, information of an S-PRS according to the S-PRS resource selected from the at least one remaining S-PRS resource; and send, via a transmitter to a second wireless communication device, second SCI according to the information of the S-PRS, wherein the SCI includes an index of the S-PRS resource, wherein the S-PRS starts from a same slot as a slot of the second SCI.

18. The first wireless communication device of claim 17, wherein a first type of information of the S-PRS is associated with a parameter of the second SCI, and the parameter of the second SCI comprises a parameter of a channel that includes the second SCI, and wherein the parameter of the channel comprises: a physical resource block (PRB) index of the channel, and wherein the channel includes a physical side-link control channel (PSCCH), and the index of the S-PRS resource is associated with a lowest PRB index occupied by the PSCCH including the second SCI, or wherein the parameter of the channel comprises: a slot index of the channel, an orthogonal frequency division multiplexing (OFDM) symbol index of the channel, a physical resource block (PRB) index of the channel, and wherein the channel includes a physical side-link shared channel (PSSCH).

* * * * *